US012711972B2

(12) United States Patent
Turner et al.

(10) Patent No.: US 12,711,972 B2
(45) Date of Patent: Aug. 18, 2026

(54) MULTI-RATE AUDIO MIXING

(71) Applicant: QUALCOMM Incorporated, San Diego, CA (US)

(72) Inventors: Richard Turner, Belfast (IE); Derrick Rea, Broughshane (IE); Megan Lucy Taggart, Newtownabbey (IE); Laurent Wojcieszak, Belfast (IE)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 18/680,827

(22) Filed: May 31, 2024

(65) Prior Publication Data

US 2025/0372107 A1 Dec. 4, 2025

(51) Int. Cl.

*G10L 19/00* (2013.01)
*G10L 19/02* (2013.01)
*G10L 19/16* (2013.01)

(52) U.S. Cl.

CPC ........ *G10L 19/0204* (2013.01); *G10L 19/167* (2013.01); *G10L 19/02* (2013.01)

(58) Field of Classification Search

CPC ..... G10L 19/008; G10L 19/167; G10L 19/24; G10L 19/0212; G10L 19/02; G10L 25/27;

(Continued)

(56) References Cited

U.S. PATENT DOCUMENTS 9,697,838 B2 7/2017 Nagel et al.
9,892,735 B2 * 2/2018 Fuchs ................ G10L 19/0017

(Continued)

OTHER PUBLICATIONS

3GPP: "3rd Generation Partnership Project, Technical Specification Group Services and System Aspects, Codec for Immersive Voice and Audio Services, Detailed Algorithmic Description incl. RTP payload format and SDP parameter definitions (Release 18)", 3GPP TS 26.253 V1.1.0, Technical Specification, 3rd Generation Partnership Project (3GPP), Mobile Competence Centre, 650, Route Des Lucioles, F-06921 Sophia-Antipolis Cedex, France, vol. SA WG4, No. V1.1.0, Feb. 27, 2024, pp. 1-766, XP052577202, sections 4.3.1, 5.3.1 and 5.3.4.1, table 5.3.1.

(Continued)

*Primary Examiner* — Vu B Hang
(74) *Attorney, Agent, or Firm* — Holland & Hart LLP

(57) ABSTRACT

This disclosure provides methods, components, devices and systems for multi-rate audio mixing. Some aspects more specifically relate to mixing audio streams with different sample rates. In some examples, an audio source device may convert audio streams with different sample rates to the frequency domain using a modified discrete cosine transform (MDCT), and the audio source device may mix the audio streams with different sample rates in the frequency domain. The audio source device may apply a pre-emphasis filter after mixing the audio streams in the frequency domain. An audio stream with a higher sample rate may be down-sampled by dropping frequency bins after converting the audio stream to the frequency domain. Additionally, or alternatively, an audio stream with a lower sample rate may be up-sampled by padding frequency bins of the frequency domain-converted audio stream.

18 Claims, 9 Drawing Sheets

(58) Field of Classification Search
CPC ... G10L 19/083; G10L 19/12; G10L 21/0232; G10L 21/0364; G10L 19/005; G10L 21/0208; G10L 15/20; G10L 25/69; G10L 19/00; G10L 21/038; G10L 19/0204; H04M 3/568; H04M 2207/185; G11B 20/00007; G11B 20/10527; G11C 7/16; G11C 2207/16
See application file for complete search history.

(56) References Cited

U.S. PATENT DOCUMENTS

| | | | | |
|---|---|---|---|---|
| 10,043,527 | B1 * | 8/2018 | Gurijala | G10L 19/018 |
| 10,141,004 | B2 * | 11/2018 | Koppens | G10L 19/22 |
| 11,477,327 | B2 * | 10/2022 | Wells-Rutherford | G10L 21/02 |
| 2009/0210239 | A1 * | 8/2009 | Yoon | G10L 19/20 704/500 |
| 2018/0197552 | A1 | 7/2018 | Fuchs et al. | |

OTHER PUBLICATIONS

International Search Report and Written Opinion PCT/US2025/029414 ISA/EPO Oct. 7, 2025.

* cited by examiner

MULTI-RATE AUDIO MIXING

TECHNICAL FIELD

This disclosure relates generally to wireless communication and, more specifically, to multi-rate audio mixing.

DESCRIPTION OF THE RELATED TECHNOLOGY

Wireless communication networks may include various types of wireless communication devices including network entities (such as wireless access points (AP) or base stations (BS)), client devices (such as wireless stations (STAs) or user equipment (UEs)), and other wireless nodes. These wireless communication devices may communicate with one another via a variety of technologies and wireless communication protocols, including wireless local area network (WLAN) or Wi-Fi-based protocols or cellular (such as 4G, 5G, or 6G)-based protocols. The wireless communication networks may be capable of supporting communication with multiple users by sharing the available system resources (such as time, frequency, and spatial resources). To enable features or provide improved performance, the wireless communication devices may employ technologies such as orthogonal frequency divisional multiple access (OFDMA), multi-user Multiple-Input Multiple-Output (MU-MIMO), spatial multiplexing, and beamforming. For greater inter-operability, the wireless communication networks may support backwards compatibility (such as supporting legacy wireless communication devices) as well as forward compatibility (such as supporting communication with wireless communication devices compatible with next-generation wireless communication standards).

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communications by a first wireless device. The method may include inputting a first media stream into a first frequency domain converter based on a first sample rate of the first media stream, inputting a second media stream into a second frequency domain converter based on a second sample rate of the second media stream that is different from the first sample rate of the first media stream, mixing a first output from the first frequency domain converter with a second output from the second frequency domain converter to obtain a mixed frequency domain output, encoding the mixed frequency domain output to obtain a mixed media stream, and transmitting the mixed media stream including the first media stream and the second media stream to a second wireless device.

Another innovative aspect of the subject matter described in this disclosure can be implemented in a first wireless device for wireless communications. The first wireless device may include a processing system that includes processor circuitry and memory circuitry that stores code. The processing system may be configured to cause the first wireless device to input a first media stream into a first frequency domain converter based on a first sample rate of the first media stream, input a second media stream into a second frequency domain converter based on a second sample rate of the second media stream that is different from the first sample rate of the first media stream, mix a first output from the first frequency domain converter with a second output from the second frequency domain converter to obtain a mixed frequency domain output, encode the mixed frequency domain output to obtain a mixed media stream, and transmit the mixed media stream including the first media stream and the second media stream to a second wireless device.

Another innovative aspect of the subject matter described in this disclosure can be implemented in a first wireless device for wireless communications. The first wireless device may include means for inputting a first media stream into a first frequency domain converter based on a first sample rate of the first media stream, means for inputting a second media stream into a second frequency domain converter based on a second sample rate of the second media stream that is different from the first sample rate of the first media stream, means for mixing a first output from the first frequency domain converter with a second output from the second frequency domain converter to obtain a mixed frequency domain output, means for encoding the mixed frequency domain output to obtain a mixed media stream, and means for transmitting the mixed media stream including the first media stream and the second media stream to a second wireless device.

Another innovative aspect of the subject matter described in this disclosure can be implemented in a non-transitory computer-readable medium storing code for wireless communications. The code may include instructions executable by one or more processors to input a first media stream into a first frequency domain converter based on a first sample rate of the first media stream, input a second media stream into a second frequency domain converter based on a second sample rate of the second media stream that is different from the first sample rate of the first media stream, mix a first output from the first frequency domain converter with a second output from the second frequency domain converter to obtain a mixed frequency domain output, encode the mixed frequency domain output to obtain a mixed media stream, and transmit the mixed media stream including the first media stream and the second media stream to a second wireless device.

Some examples of the method, first wireless devices, and non-transitory computer-readable medium described herein may further include operations, features, means, or instructions for inputting the mixed media stream to a pre-emphasis filter prior to encoding and transmitting the mixed media stream.

Some examples of the method, first wireless devices, and non-transitory computer-readable medium described herein may further include operations, features, means, or instructions for dropping a subset of frequency bins of a first set of frequency bins for the first output based on a quantity of frequency bins in a second set of frequency bins for the second output.

In some examples of the method, first wireless devices, and non-transitory computer-readable medium described herein, the subset of frequency bins may be based on a frequency bandwidth of a channel for transmission of the mixed media stream.

Some examples of the method, first wireless devices, and non-transitory computer-readable medium described herein may further include operations, features, means, or instructions for padding the second output from the second frequency domain converter prior to mixing the first output and the second output based on a frequency bandwidth of a channel for transmission of the mixed media stream.

Some examples of the method, first wireless devices, and non-transitory computer-readable medium described herein may further include operations, features, means, or instructions for selecting a first quantity of frequency bins for the mixed media stream based on a first radio bearer for the mixed media stream, where the first output of the first frequency domain converter and the second output of the second frequency domain converter correspond to the first quantity of frequency bins.

In some examples of the method, first wireless devices, and non-transitory computer-readable medium described herein, the first quantity of frequency bins may be selected based on a trigger to change from a second quantity of frequency bins to the first quantity of frequency bins.

Some examples of the method, first wireless devices, and non-transitory computer-readable medium described herein may further include operations, features, means, or instructions for selecting a first table and a coefficient associated with encoding an energy envelope, a change to a partitioning of frequency bins into sub-bands, a second table associated with encoding bin residuals of the first output and the second output, or any combination thereof, based on the trigger.

In some examples of the method, first wireless devices, and non-transitory computer-readable medium described herein, jointly encoding the first output from the first frequency domain converter and the second output from the second frequency domain converter to obtain the mixed media stream.

In some examples of the method, first wireless devices, and non-transitory computer-readable medium described herein, the first frequency domain converter may be a first modified discrete cosine transform (MDCT), and the second frequency domain converter may be a second MDCT.

Some examples of the method, first wireless devices, and non-transitory computer-readable medium described herein may further include operations, features, means, or instructions for obtaining an echo canceler output associated with the first sample rate or the second sample rate based on mixing the first output of the first frequency domain converter and the second output of the second frequency domain converter.

Some examples of the method, first wireless devices, and non-transitory computer-readable medium described herein may further include operations, features, means, or instructions for inputting one or more additional media streams into a respective one or more additional frequency domain converters based on a respective one or more additional sample rates of the one or more additional media streams and mixing one or more outputs from the respective one or more additional frequency domain converters with the first output from the first frequency domain converter and the second output from the second frequency domain converter, where the mixed media stream includes the one or more additional media streams.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
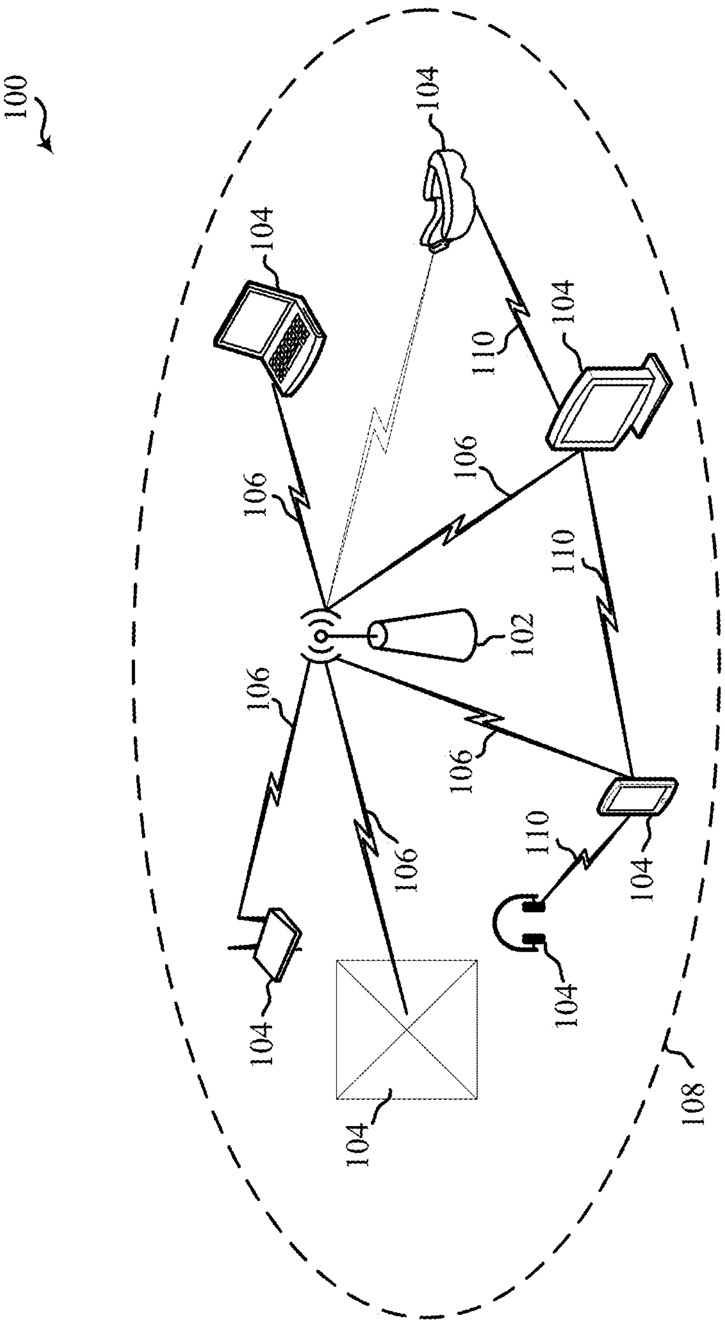
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, 5G (New Radio (NR)) or 6G standards promulgated by the 3rd Generation Partnership Project (3GPP), among others.

The described examples can be implemented in any suitable device, component, system or network that is capable of transmitting and receiving RF signals according to one or more of the following technologies or techniques: code division multiple access (CDMA), time division multiple access (TDMA), orthogonal frequency division multiplexing (OFDM), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO (MU-MIMO). The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), a non-terrestrial network (NTN), or an internet of things (IoT) network.

A wireless communication device, such as a station (STA) in a wireless local area network (WLAN), may communicate with an access point (AP) via a channel, such as a 2.4 gigahertz (GHz) (also referred to as 2 GHz), 5 GHZ, or 6 GHz wireless communication link. The wireless communication device also may communicate with wireless communication devices such as personal audio devices, in an extended personal area network (XPAN) via peer to peer (P2P) wireless communication links, such as 2.4 GHz, 5 GHz or 6 GHz wireless communication links. For example, an audio source device, such as a handset or desktop computer, may communicate with an audio sink device, such as cloud connected earbuds, a headset, AR, VR, or XR glasses, or a gaming controller (such as in communication with a gaming console). In some examples, the audio sink device may be an audio/visual (A/V) device capable of providing mixed format multimedia (such as in addition to audio). The communication links of the XPAN may be 2.4 GHZ, 5 GHZ, or 6 GHz wireless communication links for reduced latency and/or high throughput applications, such as streaming audio for gaming applications, music, or voice calls.

XPAN may support mixing audio of different sample rates and switching between a sample rate used to encode the audio. For example, XPAN techniques may use Wi-Fi to stream audio that supports high quality lossless audio at sample rates up to 192 kHz, and XPAN techniques may support streaming over a Bluetooth Low Energy (BLE) link with 48 kHz audio at very low bitrates as well as voice audio at 32 kHz. XPAN may support a highest audio quality for each link type while meeting latency requirements. XPAN may support seamless transitions when switching between different audio streams. For example, a high-quality audio stream of music may not stop or have a noticeable transition when a user switches from listening to the music to starting a game. For example, the audio source device may mix the high-quality audio and gaming audio before transmitting a mixed media stream to the sink device. Some techniques for mixing audio streams with different sample rates may increase latency for the audio streams or reduce a quality of the mixed media stream by converting the multiple different audio streams to common same sample rate.

Various aspects relate generally to mixing audio streams of different sample rates. Some aspects more specifically relate to mixing audio streams of different sample rates using a modified discrete cosine transform (MDCT) and mixing the audio streams in the MDCT frequency domain. For example, applying an MDCT to the audio streams before mixing the audio streams may enable two or more audio streams with different sample rates to be mixed in the MDCT frequency domain, which may avoid converting the audio streams to a common sample rate before mixing. In some examples, the high-quality audio stream may be down-sampled by dropping high frequency information from the MDCT output. For example, an audio source device may use a two-to-one down-sampler to mix a 96 kHz audio stream and a 192 kHz audio stream by dropping the upper half of the frequency components of the high-quality audio stream after applying the MDCT to the high-quality audio stream. The audio source device may create an up-sampler by noise filling unused MDCT high frequency components of the lower-quality audio stream. In some examples, the MDCT audio bandwidth may be matched to the link performance and adjusted dynamically. For example, if the audio source device and the audio sink device have a 48 kHz audio bandwidth (96 kHz sample rate) for a 192 KHz audio stream and a 48 kHz audio stream, some frequency bins of the 192 KHz audio stream may be dropped after being converted to the MDCT frequency domain to match the 48 kHz audio bandwidth, and the 48 kHz audio stream may be padded to match the 48 KHz audio bandwidth after being converted to the MDCT frequency domain. If the audio bandwidth changes, such as if a quality of service (QOS) of a link between the audio source device and the audio sink device changes, the quantity of dropped frequency bins of the high-quality audio stream and padded frequency bins of the low-quality audio stream may correspondingly change.

Particular aspects of the subject matter described in this disclosure can be implemented to realize one or more of the following potential advantages. In some examples, by mixing audio streams in the frequency domain by using an MDCT, the described techniques can be used to mix audio streams without additional delay caused by sampling conversion prior to mixing. In some examples, these techniques may provide a high quality mixed media stream by up-sampling a low quality audio stream to correspond to a highest quality available audio bandwidth.

FIG. 1 shows a pictorial diagram of an example wireless communication network 100. According to some aspects, the wireless communication network 100 can be an example of a wireless local area network (WLAN) such as a Wi-Fi network. For example, the wireless communication network 100 can be a network implementing at least one of the IEEE 802.11 family of wireless communication protocol standards, such as defined by the IEEE 802.11-2020 specification or amendments thereof (including, but not limited to, 802.11ay, 802.11ax (also referred to as Wi-Fi 6), 802.11az, 802.11ba, 802.11bc, 802.11bd, 802.11be (also referred to as Wi-Fi 7), 802.11bf, and 802.11bn (also referred to as Wi-Fi 8)) or other WLAN or Wi-Fi standards, such as that associated with the Integrated Millimeter Wave (IMMW) study group. In some other examples, the wireless communication network 100 can be an example of a cellular radio access network (RAN), such as a 5G or 6G RAN that implements one or more cellular protocols such as those specified in one or more 3GPP standards. In some other examples, the wireless communication network 100 can include a WLAN that functions in an interoperable or converged manner with one or more cellular RANs to provide greater or enhanced network coverage to wireless communication devices within the wireless communication network 100 or to enable such devices to connect to a cellular network's core, such as to access the network management capabilities and functionality offered by the cellular network core. In some other examples, the wireless communication network 100 can include a WLAN that functions in an interoperable or converged manner with one or more personal area networks, such as a network implementing Bluetooth or other wireless technologies, to provide greater or enhanced network coverage or to provide or enable other capabilities, functionality, applications or services.

The wireless communication network 100 may include numerous wireless communication devices including a wireless access point (AP) 102 and any number of wireless stations (STAs) 104. While only one AP 102 is shown in FIG. 1, the wireless communication network 100 can include multiple APs 102 (such as in an extended service set (ESS) deployment, enterprise network or AP mesh network), or may not include any AP at all (such as in an independent basic service set (IBSS) such as a peer-to-peer (P2P) network or other ad hoc network). The AP 102 can be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (ENB), a gNB, a transmission reception point (TRP) or another type of device or equipment included in a radio access network (RAN), including Open-RAN (O-RAN) network entities, such as a central unit (CU), a distributed unit (DU) or a radio unit (RU).

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (such as TVs, computer monitors or video gaming consoles), video game controllers, navigation systems, music or other audio or stereo devices, remote control devices, printers, kitchen appliances (including smart refrigerators) or other household appliances, key fobs (such as for passive keyless entry and start (PKES) systems), Internet of Things (IoT) devices, and vehicles, among other examples.

A single AP 102 and an associated set of STAs 104 may be referred to as an infrastructure basic service set (BSS), which is managed by the respective AP 102. FIG. 1 additionally shows an example coverage area 108 of the AP 102, which may represent a basic service area (BSA) of the wireless communication network 100. The BSS may be identified by STAs 104 and other devices by a service set identifier (SSID), as well as a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function (TSF) for establishing or maintaining timing synchronization with the AP 102. The AP 102 may provide access to external networks to various STAs 104 in the wireless communication network 100 via respective communication links 106.

To establish a communication link 106 with an AP 102, each of the STAs 104 is configured to perform passive or active scanning operations ("scans") on frequency channels in one or more frequency bands (such as the 2.4 GHZ, 5 GHZ, 6 GHz, 45 GHz, or 60 GHz bands). To perform passive scanning, a STA 104 listens for beacons, which are transmitted by respective APs 102 at periodic time intervals referred to as target beacon transmission times (TBTTs). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The selected AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an ESS including multiple connected BSSs. For example, the wireless communication network 100 may be connected to a wired or wireless distribution system that may enable multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some examples, STAs 104 may form networks without APs 102 or other equipment other than the STAs 104 themselves. One example of such a network is an ad hoc network (or wireless ad hoc network). Ad hoc networks may alternatively be referred to as mesh networks or P2P networks. In some examples, ad hoc networks may be implemented within a larger network such as the wireless communication network 100. In such examples, while the STAs 104 may be capable of communicating with each other through the AP 102 using communication links 106, STAs 104 also can communicate directly with each other via direct wireless communication links 110. Additionally, two STAs 104 may communicate via a direct wireless communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

In some networks, the AP 102 or the STAs 104, or both, may support applications associated with high throughput or low-latency requirements, or may provide lossless audio to one or more other devices. For example, the AP 102 or the STAs 104 may support applications and use cases associated with ultra-low-latency (ULL), such as ULL gaming, or streaming lossless audio and video to one or more personal audio devices (such as peripheral devices) or AR/VR/MR/XR headset devices. In scenarios in which a user uses two or more peripheral devices, the AP 102 or the STAs 104 may support an extended personal audio network enabling communication with the two or more peripheral devices. Additionally, the AP 102 and STAs 104 may support additional ULL applications such as cloud-based applications (such as VR cloud gaming) that have ULL and high throughput requirements.

As indicated above, in some implementations, the AP 102 and the STAs 104 may function and communicate (via the respective communication links 106) according to one or more of the IEEE 802.11 family of wireless communication protocol standards. These standards define the WLAN radio and baseband protocols for the physical (PHY) and MAC layers. The AP 102 and STAs 104 transmit and receive wireless communications (hereinafter also referred to as "Wi-Fi communications" or "wireless packets") to and from one another in the form of PHY protocol data units (PPDUs).

Each PPDU is a composite structure that includes a PHY preamble and a payload that is in the form of a PHY service data unit (PSDU). The information provided in the preamble may be used by a receiving device to decode the subsequent data in the PSDU. In instances in which a PPDU is transmitted over a bonded or wideband channel, the preamble fields may be duplicated and transmitted in each of multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 wireless communication protocol to be used to transmit the payload.

The APs 102 and STAs 104 in the wireless communication network 100 may transmit PPDUs over an unlicensed spectrum, which may be a portion of spectrum that includes frequency bands traditionally used by Wi-Fi technology, such as the 2.4 GHZ, 5 GHZ, 6 GHZ, 45 GHz, and 60 GHz bands. Some examples of the APs 102 and STAs 104 described herein also may communicate in other frequency bands that may support licensed or unlicensed communications. For example, the APs 102 or STAs 104, or both, also may be capable of communicating over licensed operating bands, where multiple operators may have respective licenses to operate in the same or overlapping frequency ranges. Such licensed operating bands may map to or be associated with frequency range designations of FR1 (410 MHz-7.125 GHZ), FR2 (24.25 GHZ-52.6 GHz), FR3 (7.125 GHZ-24.25 GHZ), FR4a or FR4-1 (52.6 GHZ-71 GHZ), FR4 (52.6 GHz-114.25 GHZ), and FR5 (114.25 GHz-300 GHz).

Each of the frequency bands may include multiple subbands and frequency channels (also referred to as subchannels). The terms "channel" and "subchannel" may be used interchangeably herein, as each may refer to a portion of frequency spectrum within a frequency band (such as a 20 MHz, 40 MHZ, 80 MHZ, or 160 MHz portion of frequency spectrum) via which communication between two or more wireless communication devices can occur. For example, PPDUs conforming to the IEEE 802.11n, 802.11ac, 802.11ax, 802.11be and 802.11bn standard amendments may be transmitted over one or more of the 2.4 GHz, 5 GHZ, or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, 240 MHz, 320 MHz, 480 MHz, or 640 MHz by bonding together multiple 20 MHz channels.

An AP 102 may determine or select an operating or operational bandwidth for the STAs 104 in its BSS and select a range of channels within a band to provide that operating bandwidth. For example, the AP 102 may select sixteen 20 MHz channels that collectively span an operating bandwidth of 320 MHz. Within the operating bandwidth, the AP 102 may typically select a single primary 20 MHz channel on which the AP 102 and the STAs 104 in its BSS monitor for contention-based access schemes. In some examples, the AP 102 or the STAs 104 may be capable of monitoring only a single primary 20 MHz channel for packet detection (such as for detecting preambles of PPDUs). Conventionally, any transmission by an AP 102 or a STA 104 within a BSS must involve transmission on the primary 20 MHz channel. As such, in conventional systems, the transmitting device must contend on and win a TXOP on the primary channel to transmit anything at all. However, some APs 102 and STAs 104 supporting ultra-high reliability (UHR) communications or communication according to the IEEE 802.11bn standard amendment can be configured to operate, monitor, contend and communicate using multiple primary 20 MHz channels. Such monitoring of multiple primary 20 MHz channels may be sequential such that responsive to determining, ascertaining or detecting that a first primary 20 MHz channel is not available, a wireless communication device may switch to monitoring and contending using a second primary 20 MHz channel. Additionally, or alternatively, a wireless communication device may be configured to monitor multiple primary 20 MHz channels in parallel. In some examples, a first primary 20 MHz channel may be referred to as a main primary (M-Primary) channel and one or more additional, second primary channels may each be referred to as an opportunistic primary (O-Primary) channel. For example, if a wireless communication device measures, identifies, ascertains, detects, or otherwise determines that the M-Primary channel is busy or occupied (such as due to an overlapping BSS (OBSS) transmission), the wireless communication device may switch to monitoring and contending on an O-Primary channel. In some examples, the M-Primary channel may be used for beaconing and serving legacy client devices and an O-Primary channel may be specifically used by non-legacy (such as UHR- or IEEE 802.11bn-compatible) devices for opportunistic access to spectrum that may be otherwise under-utilized.

Puncturing is a wireless communication technique that enables a wireless communication device (such as either an AP 102 or a STA 104) to transmit and receive wireless communications over a portion of a wireless channel exclusive of one or more particular subchannels (hereinafter also referred to as "punctured subchannels"). Puncturing specifically may be used to exclude one or more subchannels from the transmission of a PPDU, including the signaling of the preamble, to avoid interference from a static source, such as an incumbent system, or to avoid interference of a more dynamic nature such as that associated with transmissions by other wireless communication devices in overlapping BSSs (OBSSs). The transmitting device (such as an AP 102 or a STA 104) may puncture the subchannels on which there is interference and in essence spread the data of the PPDU to cover the remaining portion of the bandwidth of the channel. For example, if a transmitting device determines (such as detects, identifies, ascertains, or calculates), in association with a contention operation, that one or more 20 MHz subchannels of a wider bandwidth wireless channel are busy or otherwise not available, the transmitting device implement puncturing to avoid communicating over the unavailable subchannels while still utilizing the remaining portions of the bandwidth. Accordingly, puncturing enables a transmitting device to improve or maximize throughput, and in some instances reduce latency, by utilizing as much of the available spectrum as possible. Static puncturing in particular makes it possible to consistently use wideband channels in environments or deployments where there may be insufficient contiguous spectrum available, such as in the 5 GHz and 6 GHz bands.

The AP 102 and the STAs 104 of the wireless communication network 100 may implement technologies, protocols or procedures compliant with current and future generations of the IEEE 802.11 family of wireless communication protocol standards, such as Extremely High Throughput (EHT) operation defined by the IEEE 802.11be standard amendment and Ultra-High Reliability (UHR) operation defined by the IEEE 802.11bn standard amendments, to enable additional capabilities or features relative to previous generations, such as devices supporting only legacy operation such as Very High Throughput (VHT) operation defined by the 802.11ac standard amendment or High Efficiency (HE) operation defined by the IEEE 802.11ax standard amendment. For example, the IEEE 802.11be standard amendment introduced 320 MHz channels, which are twice as wide as those possible with the IEEE 802.11ax standard amendment. Accordingly, the AP 102 or the STAs 104 may use 320 MHz channels enabling double the throughput and network capacity, as well as providing rate versus range gains at high data rates due to linear bandwidth versus log SNR trade-off. EHT, UHR or other newer wireless communication protocols may support flexible operating bandwidth enhancements, such as broadened operating bandwidths relative to legacy operating bandwidths or more granular operation relative to legacy operation. For example, an EHT system may allow communications spanning operating bandwidths of 20 MHz, 40 MHz, 80 MHz, 160 MHz, 240 MHz, and 320 MHz while an UHR system may enable communications spanning even greater bandwidths, such as 480 MHz, 640 MHz or greater. EHT systems may, for example, support multiple bandwidth modes such as a contiguous 240 MHz bandwidth mode, a contiguous 320 MHz bandwidth mode, a noncontiguous 160+160 MHz bandwidth mode, or a noncontiguous 80+80+80+80 (or "4×80") MHz bandwidth mode.

In some examples in which a wireless communication device (such as the AP 102 or the STA 104) operates in a contiguous 320 MHz bandwidth mode or a 160+160 MHz bandwidth mode, signals for transmission may be generated by two different transmit chains of the wireless communication device each having or associated with a bandwidth of 160 MHz (and each coupled to a different power amplifier). In some other examples, two transmit chains can be used to support a 240 MHz/160+80 MHz bandwidth mode by puncturing 320 MHz/160+160 MHz bandwidth modes with one or more 80 MHz subchannels. For example, signals for transmission may be generated by two different transmit chains of the wireless communication device each having a bandwidth of 160 MHz with one of the transmit chains outputting a signal having an 80 MHz subchannel punctured therein. In some other examples in which the wireless communication device may operate in a contiguous 240 MHZ bandwidth mode, or a noncontiguous 160+80 MHz bandwidth mode, the signals for transmission may be generated by three different transmit chains of the wireless communication device, each having a bandwidth of 80 MHz. In some other examples, signals for transmission may be generated by four or more different transmit chains of the wireless communication device, each having a bandwidth of 80 MHz.

In noncontiguous examples, the operating bandwidth may span one or more disparate sub-channel sets. For example, the 320 MHz bandwidth may be contiguous and located in the same 6 GHz band or noncontiguous and located in different bands or regions within a band (such as partly in the 5 GHz band and partly in the 6 GHz band).

In some examples, the AP 102 or the STA 104 may benefit from operability enhancements associated with EHT, UHR and newer generations of the IEEE 802.11 family of wireless communication protocol standards. For example, the AP 102 or the STA 104 attempting to gain access to the wireless medium of the wireless communication network 100 may perform techniques (which may include modifications to existing rules, structure, or signaling implemented for legacy systems) such as clear channel assessment (CCA) operation based on EHT or UHR enhancements such as increased bandwidth, puncturing, or refinements to carrier sensing and signal reporting mechanisms.

Transmitting and receiving devices AP 102 and STA 104 may support the use of various modulation and coding schemes (MCSs) to transmit and receive data in the wireless communication network 100 so as to optimally take advantage of wireless channel conditions, for example, to increase throughput, reduce latency, or enforce various quality of service (QOS) parameters. For example, existing technology (such as IEEE 802.11ax standard amendment protocols) supports the use of up to 1024-QAM, where a modulated symbol carries 10 bits. To further improve peak data rate, each of the AP 102 or the STA 104 may employ use of 4096-QAM (also referred to as "4k QAM"), which enables a modulated symbol to carry 12 bits. 4k QAM may enable massive peak throughput with a maximum theoretical PHY rate of 10 bps/Hz/subcarrier/spatial stream, which translates to 23 Gbps with 5/6 LDPC code (10 bps/Hz/subcarrier/spatial stream*996*4 subcarriers*8 spatial streams/13.6 us per OFDM symbol). The AP 102 or the STA 104 using 4096-QAM may enable a 20% increase in data rate compared to 1024-QAM given the same coding rate, thereby allowing users to obtain higher transmission efficiency.

In some examples, WLAN 100 may support an extended personal area network (XPAN) in which an audio source device (such as a wireless device, or a STA 115) transmitting a wireless audio signal to an audio sink device (such as a wireless earbud). The audio signal may be associated with multiple audio streaming modes for different operations, such as gaming or music, as elucidated above. In some examples, a user may switch between two audio modes using the audio source device, and the user may transition between a high-quality mode and a gaming mode. For example, a user may switch from listening to music to starting a game, and the audio in high-quality mode may continue to stream (such as high-quality audio playout may not be stopped). Accordingly, the audio sink device may transition between the two audio modes based on the user's transition. For example, a mixer in the audio sink device and the audio source device may mix audio streams associated with the two audio modes and an encoder may output the audio signal to an earphone. The high-quality stream may be associated with high quality audio, and the gaming stream may be associated with low latency. Switching between the two audio streams may result in increased latency. For example, the gaming audio stream may be associated with a quantity of processing time (such as 32 milliseconds of controlling application time/20 milliseconds from an audio encoder input to the audio output). Additionally, or alternatively, the high-quality audio stream (such as lossless audio stream) may be associated with a quantity of processing time (such as 250 milliseconds of controlling application time/220 milliseconds after input to the encoder). As a result, different encoders within the audio source device may be associated with different amounts of output latency. For example, the high-quality audio stream may be associated with a latency of 220 milliseconds and the gaming audio stream may be associated with a latency of 20 milliseconds. In some examples, the audio sink device may decrease the latency associated with switching between the two audio streams. However, decreasing the latency may result in lowering the quality of the audio signal and in causing audio distortion. For example, a decrease in latency may result in a processing rate change of 2 milliseconds/second, or up to 5 milliseconds/second, resulting in increased (such as noticeable audio distortion).

XPAN may support mixing audio of different sample rates and switching the sample rate at which audio is encoded. XPAN may use Wi-Fi to stream audio that allows support for high-quality lossless audio at sample rates up to 192 kHz. However, a system supporting XPAN also may support streaming over a BLE link with 48 KHz audio at bitrates as low as 100 kbps and voice audio at 38 kHz. XPAN may have a set of requirements for handling audio with multiple sample rates and use a maximum audio quality for each link type and meet latency requirements. For example, XPAN may provide seamless transitions when switching between different audio use cases. For example, high-quality audio playout may not stop when a user switches from listening to music to starting a game. For example, the high-quality audio and gaming audio may be mixed to provide the audio sink device output. XPAN may switch between Wi-Fi and Bluetooth links as well as between high-quality, gaming, and voice audio. As such, an XPAN system may support switching audio bandwidth sizes and mixing audio with different sample rates. In some examples, an SRC may introduce additional latency to the XPAN system.

In some examples, a sample rate converter (SRC) may be implemented to convert audio to one common sample rate before mixing. However, using SRCs may encode the streams using a limited set of sample rates. A wireless system may use switch bearers to switch between different links. However, some links, such as BLE, may not have enough bandwidth or latency to allow switching of an SRC, so an SRC, if used, may be switched in on the Wi-Fi bearer before audio is routed over the BLE bearer. BLE may operate at 100 kbps, which may be insufficient to encode 96 kHz or 192 kHz audio. There may be a tradeoff for code size that puts limits on a maximum audio frame size and limits a maximum audio frame to be 480 samples. Therefore, down-sampling and up-sampling before and after a codec (such as an encoder or a decoder) may improve codec efficiency. A high-quality input may be down-sampled to 48 KHz using a switch bearer, which may reduce quality. Additionally, switching from high-quality to gaming may correspond to enabling and disabling an SRC for the high-quality stream, which may consume extra bandwidth as a section of the audio may be sent twice in the stream and overlap and add (OLA) performed at the audio sink device.

An XPAN system may support mixing high-quality audio and gaming audio. Gaming audio may be delivered at 48 kHz, while high-quality audio may be delivered at sample rates up to 192 KHz. As such, input streams with different sampling frequencies may be mixed. In some examples, switching between configurations may lead to a 10 millisecond latency overhead and additional bandwidth, which may prohibit enabling an SRC when bandwidth is limited or a stream has stringent latency requirements. Additionally, an SRC may add distortion based on the alignment of an infinite impulse response (IIR) filter. A voice stream may be provided at 32 kHz, but other audio may be supplied at least at 48 KHz. A 4:3 SRC may be complex to achieve in an IIR filter with low latency.

The WLAN 100 supports techniques for mixing audio streams with different sampling rates. For example, an audio source device may mix different audio streams in the frequency domain using a frequency domain converter, such as an MDCT. The audio source device may transmit a mixed media stream to an audio sink device. For example, the audio source device may transmit a mixed media stream including a first media stream, such as a high-quality audio stream, and a second media stream, such as a lower-quality audio stream, to the audio sink device. The first media stream may be input into a first frequency domain converter, such as a first MDCT, based on a first sample rate of the first media stream, and the second media stream may be input into a second frequency domain converter, such as a second MDCT, based on a second sample rate of the second media stream. The audio source device may mix a first output from the first frequency domain encoder and a second output from the second frequency domain encoder, such as using a mixer, to obtain the mixed media stream.

In some examples, the techniques for mixing audio streams with different sampling rates in the frequency domain may avoid use of an SRC. For example, using an MDCT and mixing the audio streams in the frequency domain may remove the need for an OLA packet to switch in and out the SRC and stitch the streams together. These techniques may provide continuous mixing of a voice stream, high-quality stream, and a gaming stream, and bandwidth may be scaled to match the channel condition. In some other examples, these techniques may be implemented with an SRC.

Figure 2:
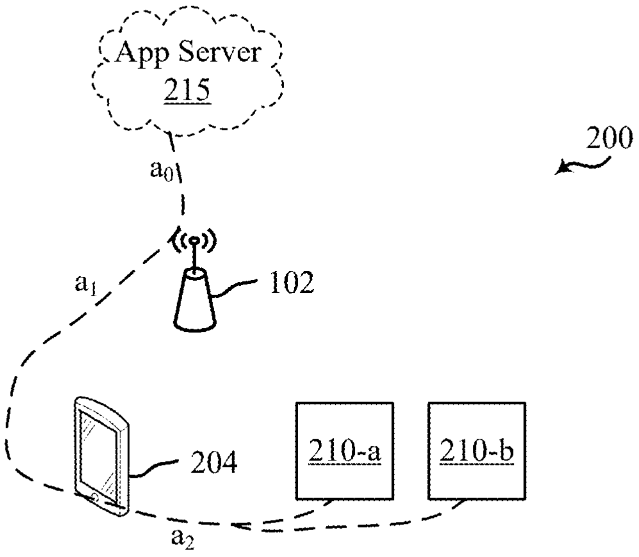
FIG. 2 show example extended personal area network (XPAN) scenarios that support multi-rate audio mixing.
Figure 2:
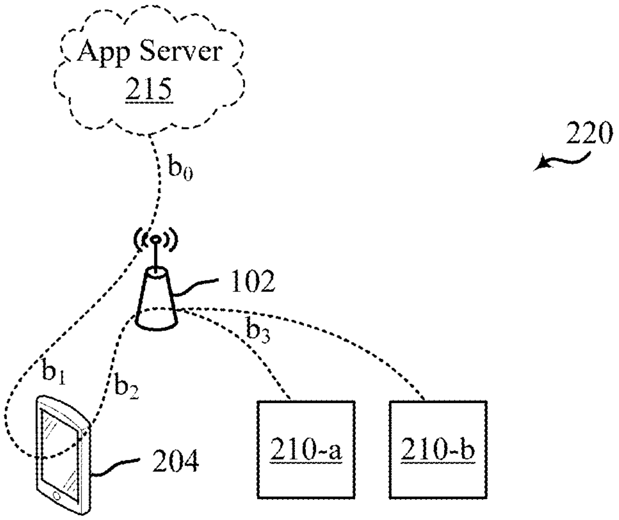

FIG. 2 show examples of XPAN scenarios 200 and 220 that include a personal wireless communication device 204, an AP 102, an application server 215, and personal audio devices 210-*a* and 210-*b*. A personal wireless communication device 204 may be a station 104 or an audio source device as described with reference to FIG. 1. For example, a personal wireless communication device 204 may be a handset, a laptop computer, or a desktop computer. The personal audio devices 210-*a* and 210-*b* may be another example of an STA 104 as described with reference to FIG. 1. For example, the personal audio devices 210-*a* and 210-*b* may be cloud connected earbuds; a headset; headphones; AR, VR, or XR glasses; or a gaming controller (such as in communication with a gaming console). A personal audio device 210 may be an example of an audio sink device. The AP 102 may be an example of an AP 102*s* described with reference to FIG. 1.

XPAN may be applied in use cases of streaming lossless audio or voice calls to personal audio devices such as personal audio devices 210-*a* and 210-*b*. For example, in XPAN scenarios, the personal audio devices 210-*a* and 210-*b* may be cloud connected earbuds; a headset; headphones; AR, VR, or XR glasses; or a gaming controller (such as in communication with a gaming console). As described herein, XPAN may enable whole or home building coverage for audio streaming. In a whole home or building coverage scenario, a user may leave a personal wireless communication device 204 behind and walk around with personal audio devices 210-*a* and 210-*b* while the personal audio devices 210-*a* and 210-*b* are still connected to the network, enabling uninterrupted listening to audio such as music, podcasts, or audio books, or enabling uninterrupted voice calls. The techniques described herein enable seamless transitions between wireless communication links for XPAN. Example supported audio formats may include 48K/96K/192K lossless or lossy audio streaming, voice calls, music, and voice assistant. For example, in an office environment a user may be at a cubicle while on a conference call and may walk to a break room while leaving the personal wireless communication device 204 at her desk without disruption of the conference call.

In the example XPAN scenarios 200 and 220, an application may run on the personal wireless communication device 204 that streams audio (such as for music, video, podcasts, audio books, or voice calls). The data for the application may be served to the personal wireless communication device 204 from an application server 215. Two routes, shown as "a" and "b," for streaming audio from the personal wireless communication device 204 to the personal audio devices 210-*a* and 210-*b* are possible, as illustrated in the example of FIG. 2, respectively.

In the example XPAN scenario 200, in a first route, shown as the "a" route, audio data may be streamed over a P2P wireless communication link between the personal wireless communication device 204 and the personal audio devices 210-*a* and 210-*b*. For example, audio data is streamed from the application server 215 to the AP 102 via a wireless communication link a0, from the AP 102 to the personal wireless communication device 204 via a wireless communication link a1, and from the personal wireless communication device 204 to the personal audio devices 210-*a* and 210-*b* via a P2P wireless communication link a2.

In the example XPAN scenario 220, in a second route, shown as the "b" route, audio data may be streamed from the personal wireless communication device 204 to the AP 102 and then from the AP 102 to the personal audio devices 210-*a* and 210-*b*. For example, audio data is streamed from the application server 215 to the AP 102 via a wireless communication link b0, from the AP 102 to the personal wireless communication device 204 via a wireless communication link b1, from the personal wireless communication device 204 back to the AP 102 via a wireless communication link b2, and from the AP 102 to the personal audio devices 210-*a* and 210-*b* via a wireless communication link b3.

The "b" route may be associated with a higher latency due to the multiple links as compared to the P2P link of the "a" route, but the "b" route may have a larger range, as an AP 102 may have a larger transmission range than a personal wireless communication device 204. In some examples, the XPAN scenario 200 and the XPAN scenario 220 may be combined. For example, the first route and the second route of the XPAN scenario 200 and the XPAN scenario 220 may be combined for an online streaming/voice over internet protocol (IP)/voice assistant scenario where the application server 215 serves audio data to an application running on the personal wireless communication device 204 via the AP 102.

As described herein, the personal wireless communication device 204 may mix different audio streams and transmit a mixed media stream to the personal audio device 210-*a* and 210-*b*. For example, the personal wireless communication device may transmit a mixed media stream including a first media stream, such as a high-quality audio stream, and a second media stream, such as a lower-quality audio stream, to the personal audio device 210-*a* and 210-*b*. The first media stream may be input into a first frequency domain converter, such as a first MDCT, based on a first sample rate of the first media stream, and the second media stream may be input into a second frequency domain converter, such as a second MDCT, based on a second sample rate of the second media stream. The personal wireless communication device 204 may mix a first output from the first frequency domain encoder and a second output from the second frequency domain encoder, such as using a mixer, to obtain the mixed media stream.

Figure 3:
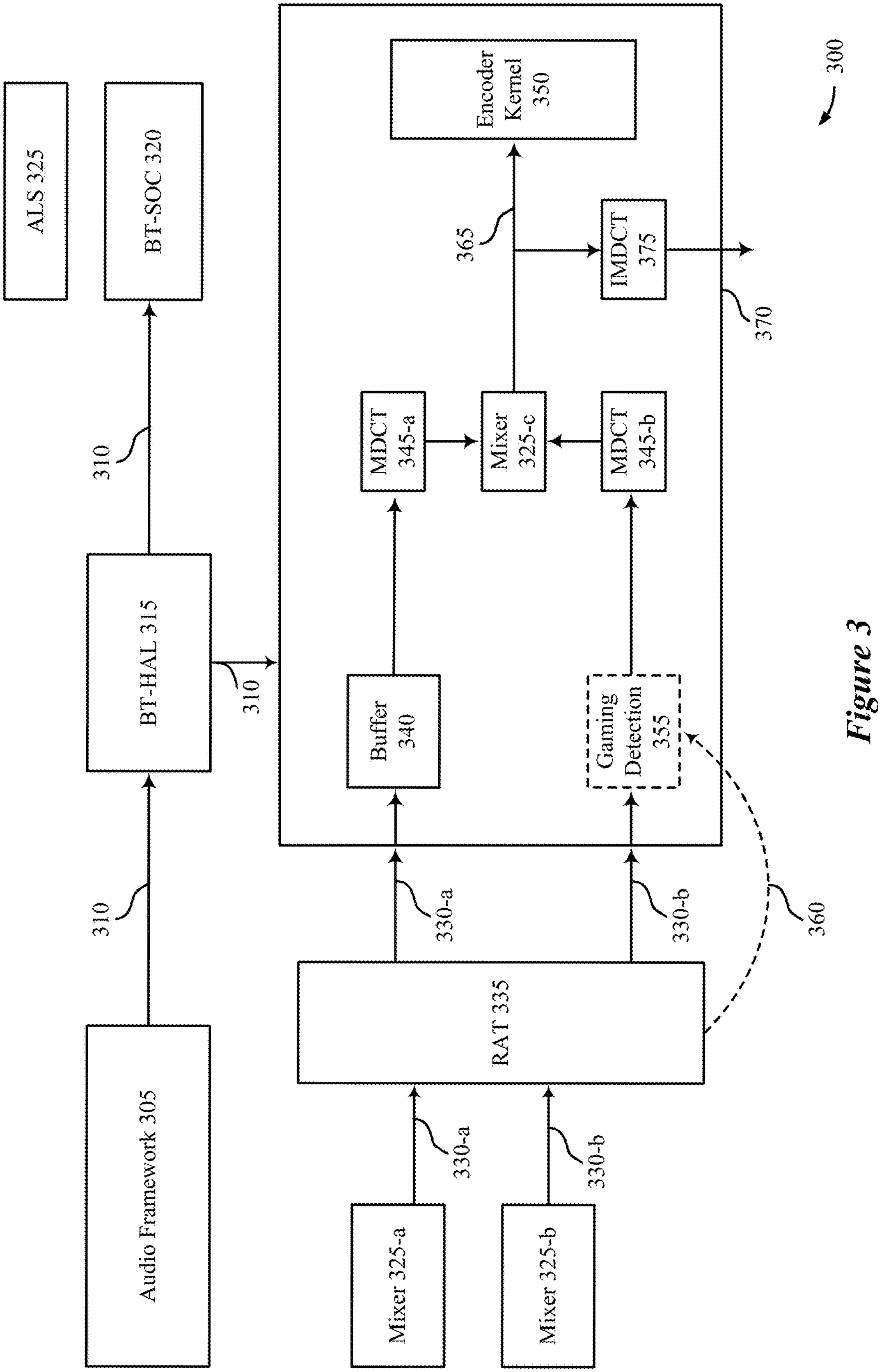
FIG. 3 shows an example audio stream mixing scheme that supports multi-rate audio mixing.

FIG. 3 shows an example of an audio stream mixing scheme 300 that supports multi-rate audio mixing. The audio stream mixing scheme 300 may include aspects of WLAN 100 in FIG. 1 or the XPAN scenarios 200 and 220, such as an audio source device and an audio sink device. For example, the audio source device may transmit audio signals to the audio sink device using the audio stream mixing scheme 300.

The audio stream mixing scheme 300 may illustrate components of the audio source device. The audio source device may transmit an audio signal to the audio sink device. The audio source device may separately mix a first audio stream 330-*a* using a mixer 325-*a* and a second audio stream 330-*b* using a mixer 325-*b*. A high-quality audio stream may be an example of the first audio stream 330-*a*, and a gaming audio stream may be an example of the second audio stream 330-*b*.

Mixer 325-*b* may be associated with a relatively lower latency of the second audio stream 330-*b*. The first audio stream 330-*a* may be associated with a sampling frequency determined for the audio stream, and the second audio stream 330-*b* may be associated with a different sampling frequency (such as 48 KHz/24-bits). The audio source device may input the first audio stream 330-*a* and the second audio stream 330-*b* to a rate adapted timer (RAT) 335, which may support multiple sampling rates for the multiple audio streams 330. The audio source device may input the first audio stream 330-*a* and the second audio stream 330-*b* into an encoder 370. The encoder 370 may mix the audio streams 330. In some examples, the encoder 370 may adjust the respective latencies of the audio streams 330 to increase audio quality.

In some examples, such as if the second audio stream 330-*b* is a gaming audio stream, the RAT 335 may output a gaming notification message 360 to a component of the encoder 370, such as a gaming detection component 355. The gaming notification message 360 may indicate a relatively low latency of the second audio stream 330-*b*. Additionally, or alternatively, the audio source device may include an audio framework 305, which may include a library for audio mode detection. In some examples, the audio framework 305 may output an audio mode message 310 to a BT hardware abstract layer (BT-HAL 315). The audio mode message 310 may indicate whether the received audio streams include an high-quality audio stream, a gaming audio stream, or both. The BT-HAL 315 may output the audio mode message 310, which may be input to the encoder 370 and the BT system on chip (such as BT-SOC 320). Additionally, or alternatively, the audio source device may include audio lossless coding (ALS) component 325, which may be in communication with the remaining components of the audio source device and may allow for lossless audio compression. The audio mode message 310 may indicate to switch to the gaming audio stream.

In some examples, the encoder 370 may use the inputs of the first audio stream 330-*a*, the second audio stream 330-*b*, the gaming notification message 360, or the audio mode message 310, or any combination thereof, to separately encode the audio streams 330. For example, the encoder 370 may use the buffer 340 to buffer the first audio stream 330-*a*. In some examples, the encoder 370 may refrain from buffering the second audio stream 330-*b*.

The audio stream mixing scheme 300, and wireless devices or wireless communications systems herein, may support using an MDCT 345 to mix audio streams with different sample rates in the frequency domain. An MDCT 345 may be an example of a frequency domain converter or a component which converts time domain samples into a frequency domain, such as the MDCT frequency domain. In some examples, an MDCT 345 may be referred to as a frequency domain encoder. The encoder 370 may perform down-sampling by dropping high frequency information from the MDCT output. For example, mixing a 96 kHz audio stream and a 196 kHz stream may create a two-to-one down-sampler. The encoder 370 may perform up-sampling by noise filling, or zeroing, of unused MDCT high frequency components.

For example, by inputting the first audio stream 330-*a* to a first MDCT 345-*a* and inputting the second audio stream 330-*b* to a second MDCT 345-*b*, the first audio stream 330-*a* and the second audio stream 330-*b* may be converted to an MDCT frequency domain. The first MDCT 345-*a* may output a first set of frequency bins corresponding to the first audio stream, and the second MDCT 345-*b* may output a second set of frequency bins corresponding to the second audio stream. If the first audio stream 330-*a* is a 96 kHz audio stream, the first MDCT 345-*a* may be a 960-point MDCT, and the first MDCT 345-*a* may output 960 frequency bins for the first audio stream 330-*a*. If the second audio stream 330-*b* is a 48 kHz audio stream, the second MDCT 345-*b* may be a 480-point MDCT, and the second MDCT 345-*b* may output 480 frequency bins for the second audio stream 330-*b*.

The first set of frequency bins and the second set of frequency bins, or at least portions thereof, may be input to a mixer 325-*c* to mix the first audio stream 330-*a* and the second audio stream 330-*b* in the MDCT frequency domain. For example, the lowest 480 frequency bins of the output of the first MDCT 345-*a* and all 480 frequency bins of the output of the second MDCT 345-*b* may be input to the mixer 325-*c*, effectively down-sampling the first audio stream 330-*a*. In some other examples, 480 higher frequency bins may be zero-filled or padded to the output of the second MDCT 345-*b* to up-sample the second audio stream 330-*b*. In some other examples, both the output of the first audio stream 330-*a* may be up-sampled and the second audio stream 330*b* may be down-sampled.

The mixer 325-*c* may output mixed frequency domain information 365 to an encoder kernel 350. The encoder kernel 350 may encode the mixed frequency domain output to obtain a mixed media stream. The encoder kernel 350 may insert an OLA packet to the audio streams 330. The OLA packet may allow for the audio source device to transition between the high-quality audio mode and the gaming audio mode and switching between the sampling rate associated with the first audio stream 330-*a* and the sampling rate associated with the second audio stream 330-*b*.

In some examples, a portion of the output of the mixer 325-*c* may be used to perform an echo cancel procedure. For example, the second audio stream 330-*b* may be a voice audio stream. A 32 kHz voice audio stream may be mixed with a 48 kHz notification audio stream using the MDCTs 345. A 48 KHz echo cancellation output may be generated while outputting a 32 kHz encoded stream. A portion of the output of the mixer 325-*c* may be input to a an inverse MDCT (IMDCT) 375. For example, 480 frequency bins may be output to the IMDCT 375 for an echo cancellation procedure, and 320 frequency bins may be output to the encoder kernel 350. The different input inputs, corresponding to the audio streams 330, may have different sample rates, and the different outputs, such as the output for the echo cancel procedure and the output for the encoder kernel 350, may have different sample rates.

The encoder kernel 350 may encode the audio streams 330 as audio signals. The audio source device may output one or more of the audio signals (such as high-quality audio signal or gaming audio signal) to the audio sink device.

In some cases, one MDCT 345 may input to another MDCT 345. For example, a first MDCT may convert the input to the frequency domain, and a second MDCT may convert the output of the first MDCT back into the time domain or a pulse-code modulation.

By using the MDCTs 345, the path of one audio stream 330 may not be affected by addition of additional audio streams 330. For example, the audio source device may initially only have the first audio stream 330-*a*. As the only audio stream 330, the first audio stream 330-*a* may be input to the first MDCT 345-*a*, and an output of the first MDCT 345-*a* may be passed through a pre-emphasis filter and sent to a compression and encoding tool, such as the encoder kernel 350. If the second audio stream 330-*b* is added, the audio source device may transition to mixing the audio streams 330, but the path of the first audio stream 330-*a* may be unaffected by the addition of the second audio stream 330-*b*. For example, the first audio stream 330-*a* may still be input to the first MDCT 345-*a*, and the second audio stream 330-*b* may be input to the second MDCT 345-*b*. In some examples, a first subset of frequency bins output by the first MDCT 345-*a* may be mixed with the frequency bins output by the second MDCT 345-*b*, or the frequency bins output by the second MDCT 345-*b* may be up-sampled or padded. The up-sampled, down-sampled, or both, outputs of the MDCTs 345 may be sent to the mixer 325-*c*, and the audio source device may send the output of the mixer 325-*c* to a pre-emphasis filter. The output of the pre-emphasis filter may be sent to the encoder kernel 350. Procedures at the receiving device, such as the audio sink device, may be unaffected by the addition of the second audio stream 330-*b*, and the audio sink device may receive and decode the mixed audio stream the same as a single audio stream. For example, the transition may not use an OLA on the decoder. Instead, mixing may be performed after the MDCT at the encoder.

Figure 4:
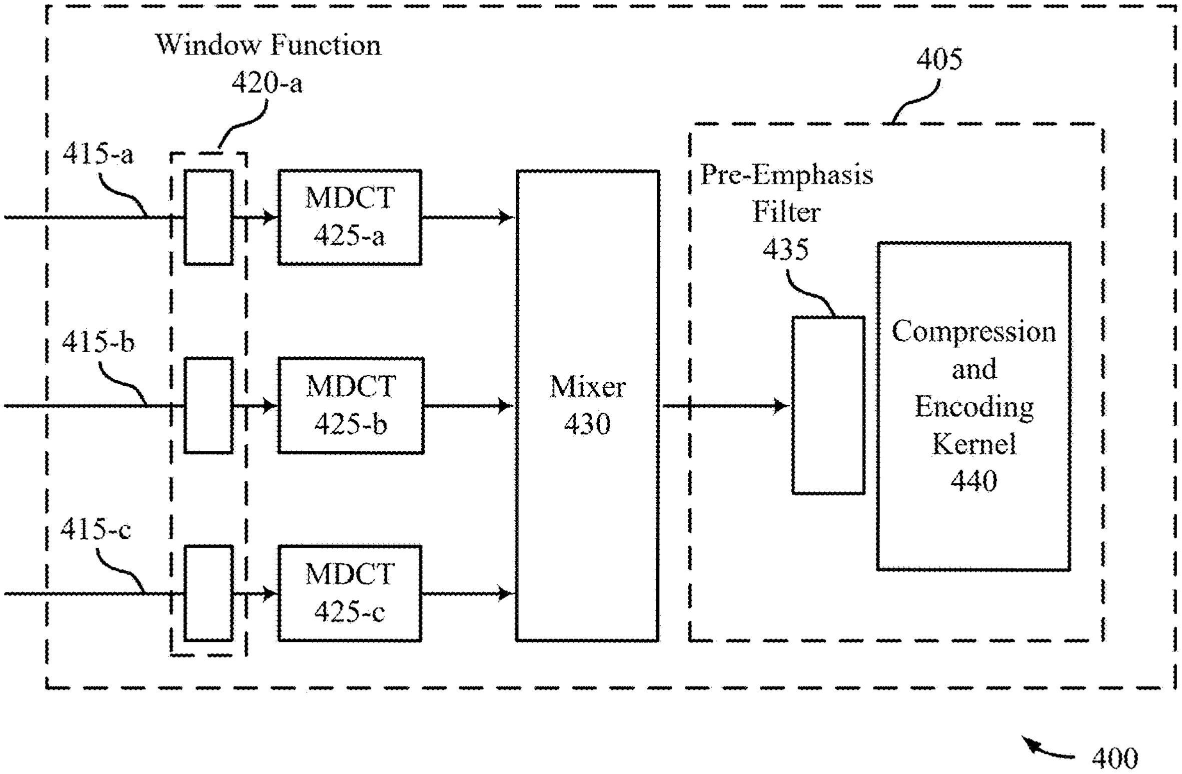
FIG. 4 shows an example audio stream mixing scheme that supports multi-rate audio mixing.
Figure 4:
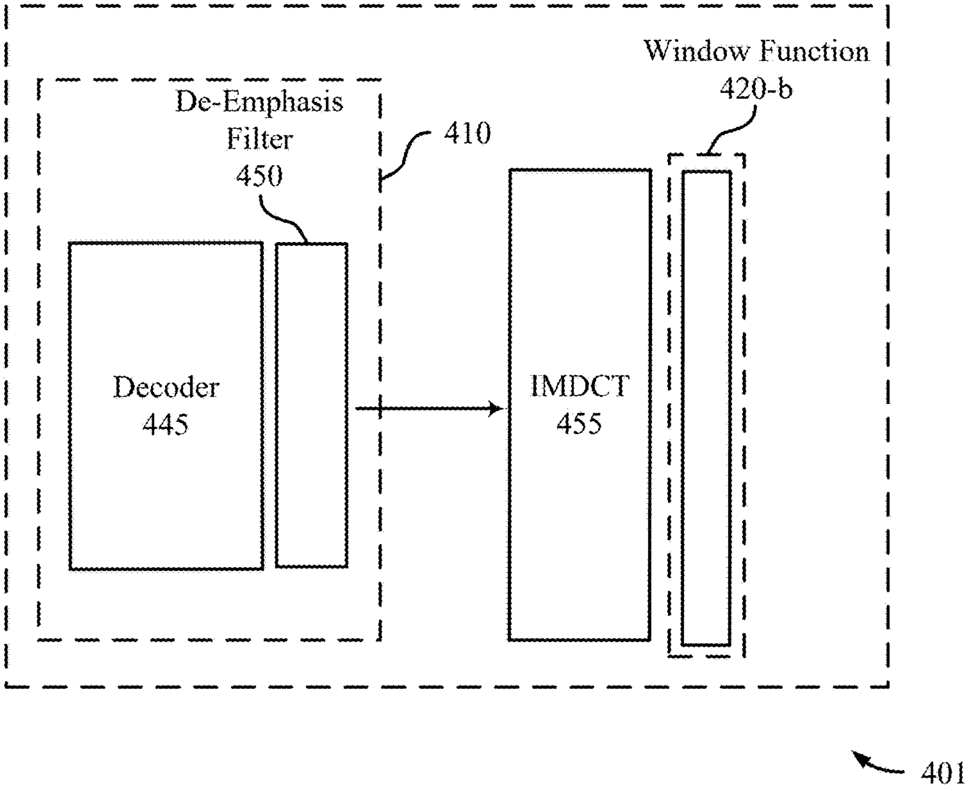

FIG. 4 shows an audio stream mixing scheme 400 at an encoder and an audio stream mixing scheme 401 at a decoder that supports multi-rate maxing. The audio stream mixing scheme 400 and the audio stream mixing scheme 401 may implement aspects of an audio stream mixing scheme 300 as described with reference to FIG. 3. For example, the audio stream mixing scheme 400 may be implemented at an audio source device which encodes a mixed media stream, and the audio stream mixing scheme 401 may be implemented at an audio sink device which decodes the mixed media stream.

An audio source device may have one or more media streams 415. For example, the audio source device may have a first media stream 415-*a*, a second media stream 415-*b*, a third media stream 415-*c*, or any combination thereof. In some examples, each media stream 415 may have a different sample rate. For example, the first media stream 415-*a* may be a high quality audio stream with a 192 kHz, 96 kHz, or 48 KHz bit rate. The second media stream 415-*b* may be a gaming audio stream with a 48 KHz bit rate. The third media stream 415-*c* may be a voice channel with a 32 kHz bit rate. In some examples, audio may be grouped into classification sets based on a QoS requirement. For example, the first media stream 415-*a* may include audio information, such as from one or more sources, with a same QoS requirement.

In some examples, the audio source device may input each media stream 415 to a window function 420, such as a window function 420-*a*. The window function 420-*a* may adjust timing information for each media stream 415.

The media streams 415 may be input into respective MDCTs 425 after the window function 420-*a*. For example, the first media stream 415-*a* may be input into a first MDCT 425-*a*, the second media stream 415-*b* may be input into a second MDCT 425-*b*, and the third media stream 415-*c* may be input into a third MDCT 425-*c*. An MDCT 425 may be configured according to a sample rate of a corresponding media stream 415. In some examples, each MDCT 425 may be input an audio frame of 10 milliseconds. For example, the first media stream 415-*a* may have a sample rate of 96 kHz, and the first MDCT 425-*a* may be a 960 point MDCT. The first MDCT 425-*a* may output 960 frequency bins in the MDCT frequency domain. The second MDCT 425-*b* may be a 480 point MDCT and may output 480 frequency bins in the MDCT frequency domain for the second media stream 415-*b*. The third MDCT 425-*c* may be a 320-point MDCT and output 320 frequency bins in the MDCT frequency domain.

An audio bandwidth of a radio bearer between the audio source device and the audio sink device may be 24 kHz. In some examples, the outputs of the MDCTs 425 may be modified based on the audio bandwidth. For example, a top 480 frequency bins of the output of the first MDCT 425-*a* may be dropped, and only a lower 480 frequency bins of the output of the first MDCT 425-*a* may be used. All frequency bins output by the second MDCT 425-*b* may be used. An output of the third MDCT 425-*c* may be padded or filled out to 480 bins, such as by zeroing higher frequency bins of the output of the third MDCT 425-*c*.

The outputs of the MDCTs 425 may be input to a mixer 430. The mixer may mix or combine the outputs of the MDCTs 425 in the frequency domain. For example, the bottom 480 frequency bins output by the first MDCT 425-*a*, the 480 frequency bins output by the second MDCT 425-*b*, and the padded or filled-out 480 frequency bins output by the third MDCT 425-*c* may be mixed by the mixer 430 in the frequency domain. The mixer 430 may generate a mixed frequency domain output.

In some examples, the audio stream mixing scheme 400 may include encoder tools 405, and the audio stream mixing scheme 401 may include decoder tools 410. The encoder tools 405 and the decoder tools 410 may each be provided one channel of audio frames, including multiple audio streams that are mixed in the frequency domain. For example, an audio bandwidth between the audio source device and the audio sink device may be a 24 kHz audio bandwidth. The encoder tools 405 may receive 480 MDCT frequency bins after mixing multiple media streams 415, and the decoder tools 410 may output 480 MDCT frequency bins after decoding a mixed media stream. In some examples, an MDCT tool stage (such as including at least the MDCTs 425) may be implemented external to the encoder tools 405 and the decoder tools 410.

The mixed frequency domain output from the mixer 430 may be input to the encoder tools 405. For example, the mixed frequency domain output may be input to a pre-emphasis filter 435 and encoded by a compression and encoding kernel 440. The encoder tools 405 may generate an audio signal that includes each of the media streams 415, and the audio source device may transmit the audio signal including each of the media streams 415 to the audio sink device over the radio bearer.

The radio sink device may receive the audio signal and decode the audio signal using the decoder tools 410. For example, the audio signal may be decoded by a decoder 445 and input to a de-emphasis filter 450 to obtain 480 frequency bins for an audio frame of the audio signal. The frequency bins may be input to an IMDCT 455. The IMDCT 455 may be a 960-point MDCT. In some examples, the frequency bins obtained from the decoder tools 410 may be padded with zeros (such as up-sampled or zero-filled) and input to the IMDCT 455. The output from the IMDCT 455 may be input to a window function 420-*b*. In some examples, the decoder may implement a buffer to handle MDCT overlap. For example, some information of the mixed media stream may be buffered based on different latencies of the media streams 415.

In some examples, the second media stream 415-*b* and the third media stream 415-*c* may each be input to an SRC to up-sample the media streams 415 to a sample rate of the first media stream 415-*a* or the audio bandwidth, or both. For example, the second media stream 415-*b* may be input to an SRC that converts the sample rate from 48 kHz to 192 kHz, and the third media stream 415-*c* may be input to an SRC that converts the sample rate from 32 kHz to 192 kHz. After up-sampling using the SRCs to a maximum sample rate in the time domain using an SRC, the streams may be mixed and encoded using an MDCT. A trigger may provide a quantity of frequency bins selected from the mixed stream. For example, the streams may be up-sampled to 192 kHz, mixed, and encoded using an MDCT into the frequency domain. A quantity of frequency bins from an output of the MDCT may be selected according to a trigger or an audio bandwidth size, or both. For example, if the audio bandwidth is 24 kHz, 480 frequency bins may be selected, and a highest 1440 frequency bins from the output of the mixer may be dropped. If the audio bandwidth changes to 48 kHz, a trigger may change a quantity of dropped frequency bins. For example, 960 frequency bins may be dropped from the output of the MDCT if the trigger indicates that he audio bandwidth has changed to 48 kHz.

Figure 5:
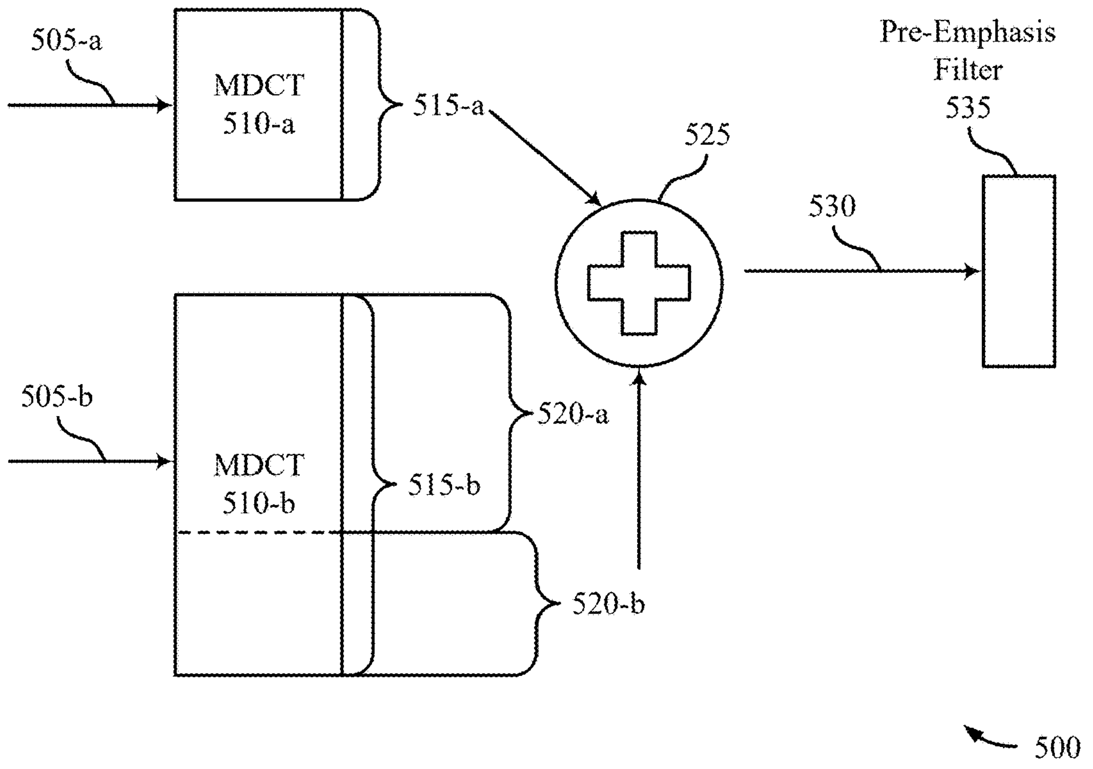
FIG. 5 shows an example pre-emphasis filtering and de-emphasis filtering that supports multi-rate audio mixing.
Figure 5:
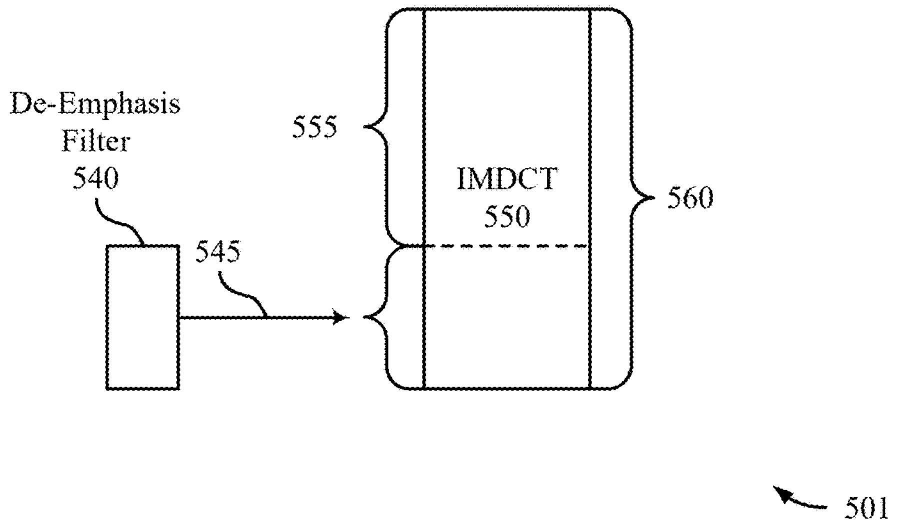

FIG. 5 shows a pre-emphasis filtering 500 and a de-emphasis filtering 01 that supports multi-rate mixing. The pre-emphasis filtering 500 may be implemented at an audio source device, and the de-emphasis filtering 501 may be implemented at an audio sink device. The pre-emphasis filtering 500 and the de-emphasis filtering 501 may include additional aspects described herein, such as windowing, encoding, buffering, and the like.

An audio source device may input a first media stream 505-*a* to a first MDCT 510-*a* and a second media stream 505-*b* to a second MDCT 510-*b*. The first media stream 505-*a* may, for example, be a 48 kHz audio stream, and the second media stream 505-*b* may, for example, be a 192 kHz audio stream. The first MDCT 510-*a* may output a first set of frequency bins 515-*a* including 48 frequency bins, and the audio source device may input the first set of frequency bins 515-*a* to a mixer 525. The second MDCT 510-*b* may output a second set of frequency bins 515-*b* including 192 frequency bins. The audio source device may drop a first subset of frequency bins 520-*a* and input a second subset of frequency bins 520-*b* to the mixer 525. For example, the audio source device may drop a top 144 frequency bins of the second set of frequency bins 515-*b* and only use a bottom 48 frequency bins of the second set of frequency bins 515-*b*.

The mixer 525 may combine or mix the first set of frequency bins 515-*a* and the second subset of frequency bins 520-*b* in the frequency domain. The mixer 525 may output a frequency domain mixed stream 530 including the combination of the first set of frequency bins 515-*a* and the second subset of frequency bins 520-*b* to a pre-emphasis filter 535. The frequency domain mixed stream 530 may include 48 frequency bins. An output from the pre-emphasis filter 535 may be encoded into an audio signal including the first media stream 505-*a* and the second media stream 505-*b* and transmitted to the audio sink device.

The audio sink device may receive and decode the audio signal to obtain a frequency domain audio signal 545. The frequency domain audio signal may be input to a de-emphasis filter 540 then an IMDCT 510-*c*. The IMDCT 550 may transform the frequency domain audio signal 545 from the frequency domain to a time domain audio signal. In some examples, the frequency domain audio signal 545 may include 48 frequency bins. The audio sink device may pad the top bins of the frequency domain audio signal 545, such as by adding zeros to a set of high frequency bins 555. The IMDCT 550 may be a 192-point MDCT, and the audio sink device may pad the frequency domain audio signal 545 with 144 zeros in the higher frequency bins. The IMDCT 550 may output audio 560, such as 192 kHz audio that includes both the first media stream 505-*a* and the second media stream 505-*b*.

Audio mixing and resampling may be combined with other filtering operations, such as lowpass filtering, bandpass filtering, or equalization filtering. Filtering techniques may be implemented in XPAN systems, where each audio class, such as voice audio, gaming audio, and high-quality audio, is supplied separately at an MDCT 510. The MDCT 510 may be split from a coded (such as an encoder or decoder), and operations such as equalization and buffering may be performed on each source in the frequency domain. For example, the audio source device may perform an equalization on the first set of frequency bins 515-*a* before mixing. In some examples, the audio source device may buffer at least some frequency bins from the second subset of frequency bins 520-*b* before mixing. For example, the audio source device may apply a 200 millisecond buffer on the second subset of frequency bins 520-*b*, and the audio source device may mix the first set of frequency bins 515-*a* with half of the frequency bins of the second subset of frequency bins 520-*b*. For example, the audio source device may buffer the other half of the frequency bins of the second subset of frequency bins 520-*b*.

In some examples, such as for a transition to providing mixed high-quality audio and gaming audio, 200 milliseconds of audio of high-quality audio may be buffered. Applying the MDCT 510 before the buffer may enable the down-sampled content to be buffered to reduce memory overhead. In some examples, a quantity of MDCT frequency bins stored in memory may be based on a radio bearer or a connection between the audio source device and the audio sink device. For example, a peer-to-peer (P2P) connection with 200 millisecond latency, most frequency bins may be stored in memory at the audio source device. For a whole home coverage (WHC) connection with 500 milliseconds of latency, half of the frequency bins may be stored in memory. For a roaming connection between an AP and a STA with 700 milliseconds of latency, one third of the frequency bins are stored in memory.

The pre-emphasis filter 535 and the de-emphasis filter 540 may be used by an MDCT-based encoder or decoder to improve encoding and decoding performance at lower frequencies. The de-emphasis filter 540 may be a complement of the pre-emphasis filter 535.

In some examples, the pre-emphasis filter 535 and the de-emphasis filter 540 may be applied before or after the MDCT conversion and prior to compression and encoding. Techniques described herein support applying pre-emphasis to mixed audio from the mixer 525, which includes multiple audio streams (such as multiple media streams 505) with any frame length modifiers applied. The pre-emphasis filter 535 and the de-emphasis filter 540 may be performed to the mixed audio signal in the frequency domain. For example, the pre-emphasis filter 535 may be applied after mixing and applied to the active frequency bins. Applying pre-emphasis to media streams 505 independently may involve applying a complex gain compensation to one of the mixed streams.

Figure 6:
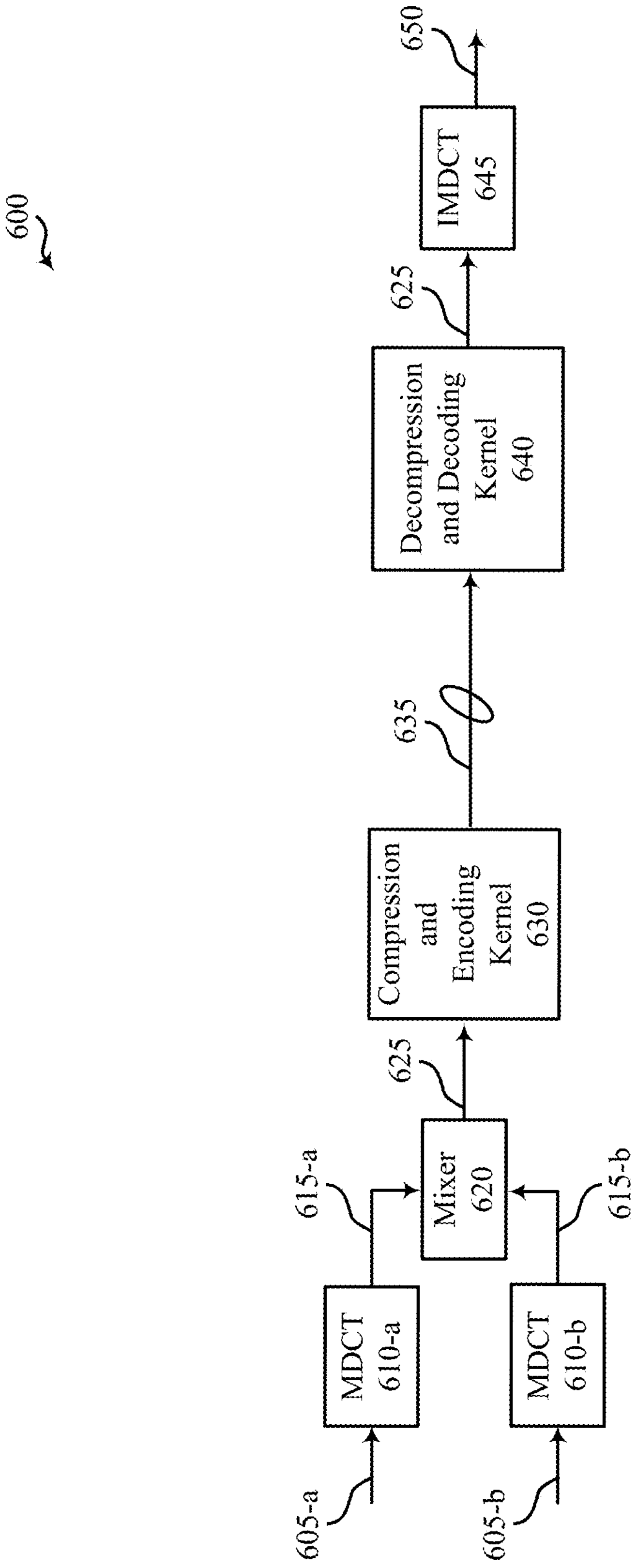
FIG. 6 shows a variable audio bandwidth configuration that supports multi-rate audio mixing.

FIG. 6 shows an example of a variable bandwidth configuration 600 that supports multi-rate mixing. The variable bandwidth configuration 600 may include aspects of an XPAN scenario 200 or 220, an audio stream mixing scheme 300, an audio stream mixing scheme 400, a pre-emphasis filtering 500 or a de-emphasis filtering 501 as described with reference to FIGS. 2-5.

An audio source device may have multiple media streams with different sample rates for transmission to an audio sink device in an XPAN scenario. For example, a first media stream 605-*a* may have a first sample rate of 192 kHz, and a second media stream 605-*b* may have a second sample rate of 48 kHz. The first media stream 605-*a* may be an example of a high-quality audio stream, and the second media stream 605-*b* may be an example of a gaming audio stream. The first media stream 605-*a* may be input to a first MDCT 610-*a*, and the second media stream 605-*b* may be input to a second MDCT 610-*b*.

An MDCT 610 may be configured in accordance with a sample rate of a corresponding media stream 605. For example, the first MDCT 610-*a* may be a 1920-point MDCT for the 192 kHz media stream, and the second MDCT 610-*b* may be a 480-point MDCT for the 48 KHz media stream. The first MDCT 610-*a* may convert the first media stream 605-*a* to the MDCT frequency domain and output a first set of frequency bins 615-*a*. For example, the first MDCT 610-*a* may output 1920 frequency bins by converting a 10 millisecond audio frame. The second MDCT 610-*b* may convert the second media stream 605-*b* to the MDCT frequency domain and a second set of frequency bins 615-*b* including 480 frequency bins. The first set of frequency bins 615-*a* and the second set of frequency bins 615-*b* may be mixed in the frequency domain by a mixer 620 to generate a mixed frequency domain output 625. In some examples, a pre-emphasis filter may be applied to the mixed frequency domain output 625.

In some examples, an audio bandwidth of a radio bearer between the audio source device and the audio sink device may have a variable bandwidth. For example, the radio bearer may have an audio bandwidth of 96 kHz, 48 kHz, or 24 kHz. In some examples, the audio bandwidth may change, such as based on a change to a QoS of a link between the audio source device and the audio sink device. In some examples, the audio bandwidth may be restricted to match channel bandwidth, such as for BLE.

In some examples, some frequency bins output by an MDCT 615 may be dropped based on the audio bandwidth. For example, the audio bandwidth may be 24 kHz, and the top 1440 frequency bins of the 1920 frequency bins in the first set of frequency bins 615-*a* may be dropped. Dropping the higher frequency bins may down-sample the first media stream 605-*a*. A bottom 480 frequency bins of the first set of frequency bins 615-*a* may be mixed with the 480 frequency bins of the second set of frequency bins 615-*b* at the mixer 620 to obtain 480 frequency bins for the mixed frequency domain output 625. The mixed frequency domain output 625 may be encoded by an encoder kernel 630 and transmitted as an audio signal 635 over the radio bearer. A decoding kernel at the audio sink device, such as a decompression and decoding kernel 640, may decode the audio signal 635 to obtain the mixed frequency domain output 625. The mixed frequency domain output 625 may be up-sampled and input to an IMDCT 6450-*c* to convert the mixed frequency domain output to a high quality audio stream 650. The IMDCT 645 may be a 1920-point IMDCT. For example, the mixed frequency domain output 625 may be padded with 1440 zeroed out higher frequency bins to up-sample before converting the mixed audio stream to the time domain. The encoding kernel may configured to process 192 kHz audio for the 96 kHz audio bandwidth.

In some examples, frequency bins output by an MDCT 615 may be padded, or higher frequency bins may be zero-filled to up-sample a media stream 605 that has been converted to the frequency domain before mixing. For example, the audio bandwidth may be 24 kHz, and the 480 frequency bins of the second set of frequency bins 615-*b* may be padded to 1920 frequency bins. For example, 1440 higher frequency bins may be zero-filled for the second set of frequency bins 615-*b* before mixing with the 1920 frequency bins of the first set of frequency bins 615-*a*. The mixed frequency domain output 625 may have 1920 frequency bins and may be transmitted to the audio sink device using the 24 kHz audio bandwidth. The encoding kernel may configured to process 48 kHz audio for the 24 kHz audio bandwidth.

In some examples, a first portion of the first set of frequency bins 615-*a* may be dropped, and the second set of frequency bins 615-*b* may be padded. For example, the audio bandwidth may be 48 KHz. 960 frequency bins of the first set of frequency bins 615-*a* may be dropped, and the second set of frequency bins 615-*b* may be padded to 960 frequency bins. The encoding kernel may configured to process 96 kHz audio for the 48 kHz audio bandwidth.

In some examples, the audio bandwidth may be adjusted based on a trigger. For example, the audio source device and the audio sink device may switch to a different radio bearer with a different audio bandwidth based on a trigger. The trigger may adjust a quantity of frequency bins to drop, such as from the first set of frequency bins 615-*a*, or a quantity of frequency bins to pad, such as for the second set of frequency bins 615-*b*. For example, the audio bandwidth may switch from a 24 kHz audio bandwidth to a 48 kHz audio bandwidth. A different quantity of frequency bins may be selected to be dropped or padded based on the change to the audio bandwidth. For example, changing from Wi-Fi to BLE or changing from a P2P link to a WHC link may trigger a change in the audio bandwidth or a change in radio bearers. In some examples, the start of an application on a source device, such as a start of a game or a music application, may trigger a change in radio bearer. In some examples, an application coming into focus at the audio source device, such as flicking between a music media app, video app, and a game, may trigger a change in radio bearer. In some examples, a change to a virtual reality or augmented reality application may trigger a change in radio bearer. In some examples, a link QoS change may trigger a radio bearer change, such as a link QoS change triggered by user input to the audio sink device.

In some examples, the audio source device may select a quantity of bins per band used in the coder (encoder), a table to encode an energy envelope at the encoder kernel 630, a coefficient associated with encoding the energy envelope, a partitioning of the frequency domain bins into sub-bands, a table to encode the frequency bin residuals, or any combination thereof. The audio source device may reselect any one or more of these parameters based on a trigger which changes the radio bearer for the audio signal 635. For example, if the audio bandwidth changes from 48 kHz to 96 kHz, a table to encode the energy envelope, a quantity of bins per sub-band, and a table to encode the frequency bin residuals, among other parameters, may be reselected.

Figure 7:
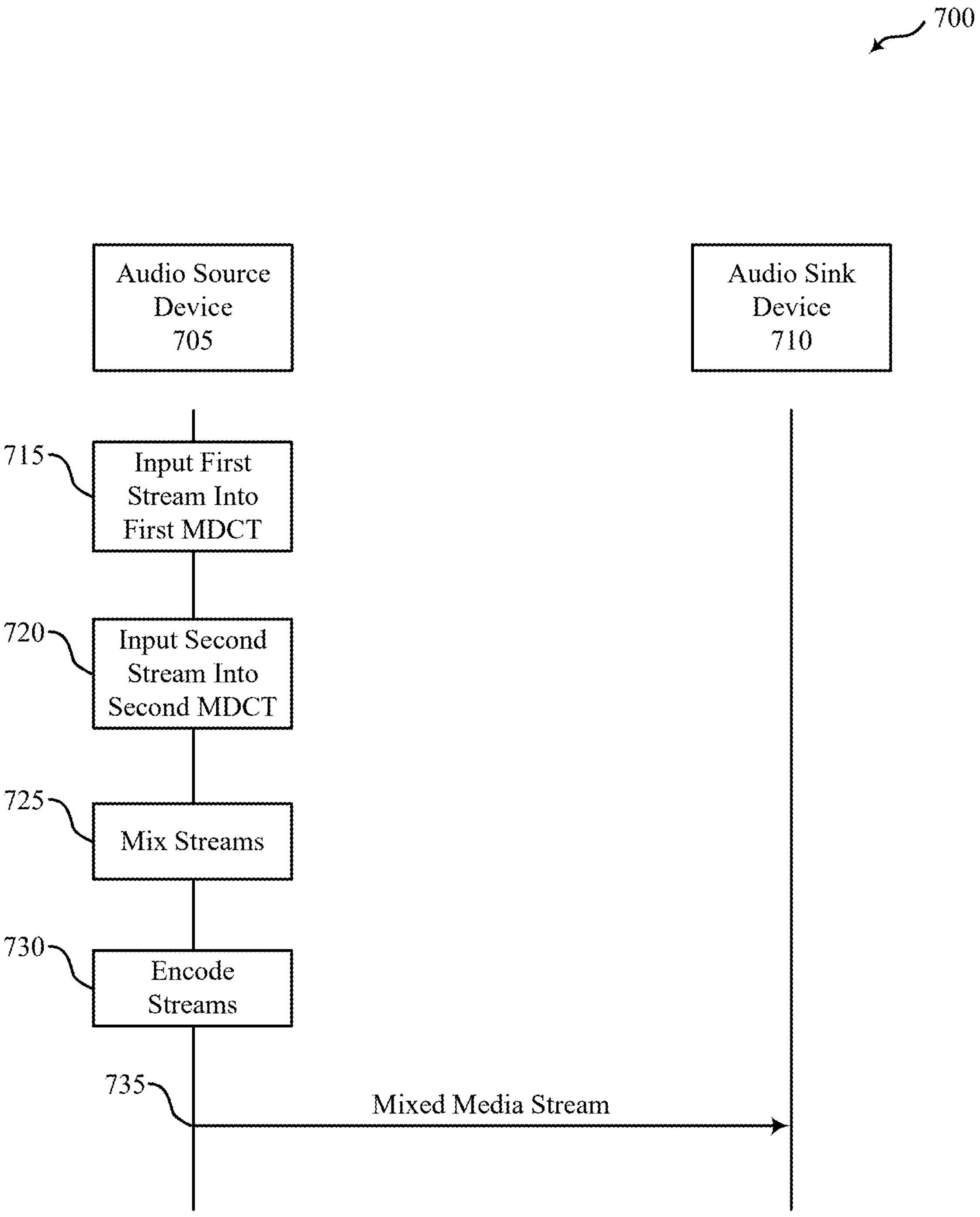
FIG. 7 shows a process flow that supports multi-rate audio mixing.

FIG. 7 illustrates an example of a process flow 700 that supports multi-rate mixing. For example, the process flow 700 may support techniques for mixing multiple media streams with different sample rates in the frequency domain. The process flow 700 may be implemented by an audio source device 705 or an audio sink device 710, or both. The audio source device 705 may be an example of an AP 102 or a STA 104 as described with reference to FIG. 1. The audio sink device 710 may be an example of a STA 104. For example, the audio source device may be a mobile device which applications that provide audio streams, and the audio sink device may be a set of headphones which receives the audio from the mobile device. In the following description of the process flow 700, the operations between the audio source device 705 and the audio sink device 710 may be transmitted in a different order than the example order shown, or the operations performed by the audio source device 705 and the audio sink device 710 may be performed in different orders or at different times. Some operations also may be omitted from the process flow 700, and other operations may be added to the process flow 700.

At 715, the audio source device 705 may input a first media stream into a first frequency domain converter based on a first sample rate of the first media stream. At 720, the audio source device 705 may input a second media stream into a second frequency domain converter based on a second sample rate of the second media stream that is different from the first sample rate of the first media stream. For example, the first media stream and the second media stream may have different sample rates. The first media stream may be an example of a high-quality audio stream at 96 kHz or 192 kHz, and the second media stream may be an example of a gaming audio stream at 48 kHz or a voice audio stream at 32 kHz. The first frequency domain converter and the second frequency domain converter may each be an example of an MDCT.

The first frequency converter and the second frequency domain converter may convert the first media stream and the second media stream, respectively, into a frequency domain, such as an MDCT frequency domain. For example, the first frequency converter may output a first set of frequency bins, and the second frequency converter may output a second set of frequency bins. In some examples, the audio source device may drop a subset of frequency bins of the first set of frequency bins. In some examples, the dropped subset of frequency bins may be based on an audio bandwidth of a radio bearer or link between the audio source device 705 and the audio sink device 710. For example, the subset of frequency bins is based at least in part on a frequency bandwidth of a channel for transmission of the mixed media stream. In some examples, the audio source device 705 may pad the second output from the second frequency domain converter. For example, the audio source device may zero-fill high frequency bins of the second set of frequency bins based on the audio bandwidth of the radio bearer.

At 725, the audio source device 705 may mix a first output from the first frequency domain converter with a second output from the second frequency domain converter to obtain a mixed frequency domain output. For example, the audio source device 705 may mix the first media stream and the second media stream in the frequency domain after converting the first media stream and the second media stream to the frequency domain using MDCTs. In some examples, the mixing may occur after dropping a subset of frequency bins, padding frequency bins, or both. A mixer at the audio source device 705 may output a mixed frequency domain output which includes the first media stream and the second media stream, mixed in the frequency domain.

At 730, the audio source device 705 may encode the mixed frequency domain output to obtain a mixed media stream. At 735, the audio source device 705 may transmit the mixed media stream to the audio sink device 710. For example, the audio source device 705 may transmit the mixed media stream to the audio sink device 710 via an audio bandwidth of a radio bearer.

Figure 8:
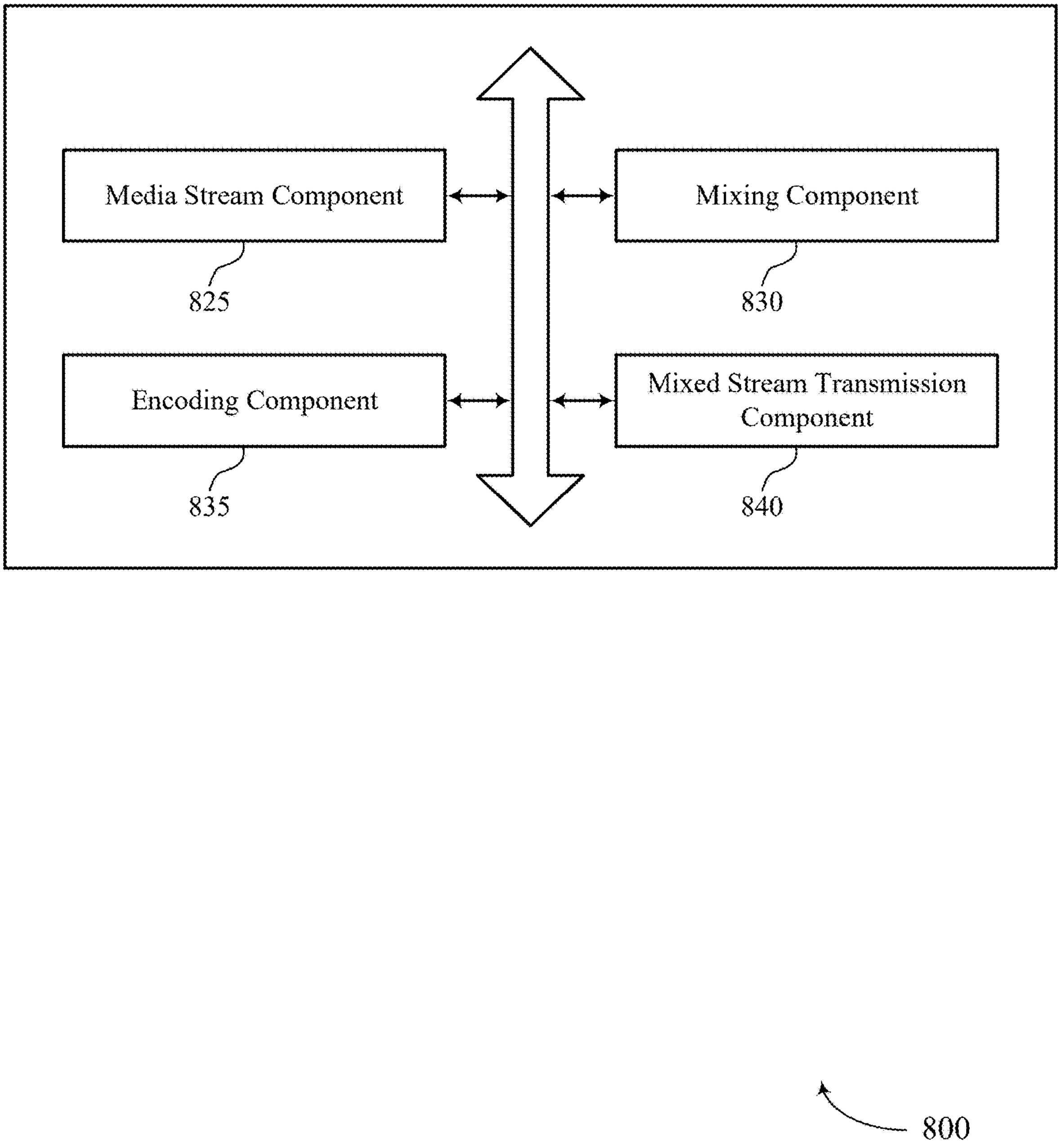
FIG. 8 shows a block diagram of an example wireless communication device that supports multi-rate audio mixing.

FIG. 8 shows a block diagram of an example wireless communication device 800 that supports multi-rate audio mixing. In some examples, the wireless communication device 800 is configured to perform the process 900 described with reference to FIG. 9. The wireless communication device 800 may include one or more chips, SoCs, chipsets, packages, components or devices that individually or collectively constitute or include a processing system. The processing system may interface with other components of the wireless communication device 800, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 800 may transmit the information output from the chip. In such an example, the second interface may refer to an interface between the processing system of the chip and a reception component, such that the wireless communication device 800 may receive information that is then passed to the processing system. In some such examples, the first interface also may obtain information, such as from the transmission component, and the second interface also may output information, such as to the reception component.

The processing system of the wireless communication device 800 includes processor (or "processing") circuitry in the form of one or multiple processors, microprocessors, processing units (such as central processing units (CPUs), graphics processing units (GPUs), neural processing units (NPUs) (also referred to as neural network processors or deep learning processors (DLPs)), or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or ROM, or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (such as IEEE compliant) modem or a cellular (such as 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some examples, the wireless communication device 800 can be configurable or configured for use in an AP or STA, such as the AP 102 or the STA 104 described with reference to FIG. 1. In some other examples, the wireless communication device 800 can be an AP or STA that includes such a processing system and other components including multiple antennas. The wireless communication device 800 is capable of transmitting and receiving wireless communications in the form of, for example, wireless packets. For example, the wireless communication device 800 can be configurable or configured to transmit and receive packets in the form of physical layer PPDUs and MPDUs conforming to one or more of the IEEE 802.11 family of wireless communication protocol standards. In some other examples, the wireless communication device 800 can be configurable or configured to transmit and receive signals and communications conforming to one or more 3GPP specifications including those for 5G NR or 6G. In some examples, the wireless communication device 800 also includes or can be coupled with one or more application processors which may be further coupled with one or more other memories. In some examples, the wireless communication device 800 further includes a user interface (UI) (such as a touchscreen or keypad) and a display, which may be integrated with the UI to form a touchscreen display that is coupled with the processing system. In some examples, the wireless communication device 800 may further include one or more sensors such as, for example, one or more inertial sensors, accelerometers, temperature sensors, pressure sensors, or altitude sensors, that are coupled with the processing system. In some examples, the wireless communication device 800 further includes at least one external network interface coupled with the processing system that enables communication with a core network or backhaul network that enables the wireless communication device 800 to gain access to external networks including the Internet.

The wireless communication device 800 includes a media stream component 825, a mixing component 830, an encoding component 835, and a mixed stream transmission component 840. Portions of one or more of the media stream component 825, the mixing component 830, the encoding component 835, and the mixed stream transmission component 840 may be implemented at least in part in hardware or firmware. For example, one or more of the media stream component 825, the mixing component 830, the encoding component 835, and the mixed stream transmission component 840 may be implemented at least in part by at least a processor or a modem. In some examples, portions of one or more of the media stream component 825, the mixing component 830, the encoding component 835, and the mixed stream transmission component 840 may be implemented at least in part by a processor and software in the form of processor-executable code stored in memory.

The wireless communication device 800 may support wireless communications in accordance with examples as disclosed herein. The media stream component 825 is configurable or configured to input a first media stream into a first frequency domain converter based on a first sample rate of the first media stream. In some examples, the media stream component 825 is configurable or configured to input a second media stream into a second frequency domain converter based on a second sample rate of the second media stream that is different from the first sample rate of the first media stream. The mixing component 830 is configurable or configured to mix a first output from the first frequency domain converter with a second output from the second frequency domain converter to obtain a mixed frequency domain output. The encoding component 835 is configurable or configured to encode the mixed frequency domain output to obtain a mixed media stream. The mixed stream transmission component 840 is configurable or configured to transmit the mixed media stream including the first media stream and the second media stream to a second wireless device.

In some examples, the encoding component 835 is configurable or configured to input the mixed media stream to a pre-emphasis filter prior to encoding and transmitting the mixed media stream.

In some examples, the mixing component 830 is configurable or configured to drop a subset of frequency bins of a first set of frequency bins for the first output based on a quantity of frequency bins in a second set of frequency bins for the second output.

In some examples, the subset of frequency bins is based on a frequency bandwidth of a channel for transmission of the mixed media stream.

In some examples, the mixing component 830 is configurable or configured to pad the second output from the second frequency domain converter prior to mixing the first output and the second output based on a frequency bandwidth of a channel for transmission of the mixed media stream.

In some examples, the mixing component 830 is configurable or configured to select a first quantity of frequency bins for the mixed media stream based on a first radio bearer for the mixed media stream, where the first output of the first frequency domain converter and the second output of the second frequency domain converter correspond to the first quantity of frequency bins.

In some examples, the first quantity of frequency bins is selected based on a trigger to change from a second quantity of frequency bins to the first quantity of frequency bins.

In some examples, the mixing component 830 is configurable or configured to select a first table and a coefficient associated with encoding an energy envelope, a change to a partitioning of frequency bins into sub-bands, a second table associated with encoding bin residuals of the first output and the second output, or any combination thereof, based on the trigger.

In some examples, the encoding component 835 is configurable or configured to jointly encode the first output from the first frequency domain converter and the second output from the second frequency domain converter to obtain the mixed media stream.

In some examples, the first frequency domain converter is a first modified discrete cosine transform, and the second frequency domain converter is a second modified discrete cosine transform.

In some examples, the mixing component 830 is configurable or configured to obtain an echo canceler output associated with the first sample rate or the second sample rate based on mixing the first output of the first frequency domain converter and the second output of the second frequency domain converter.

In some examples, the media stream component 825 is configurable or configured to input one or more additional media streams into a respective one or more additional frequency domain converters based on a respective one or more additional sample rates of the one or more additional media streams. In some examples, the mixing component 830 is configurable or configured to mix one or more outputs from the respective one or more additional frequency domain converters with the first output from the first frequency domain converter and the second output from the second frequency domain converter, where the mixed media stream includes the one or more additional media streams.

Figure 9:
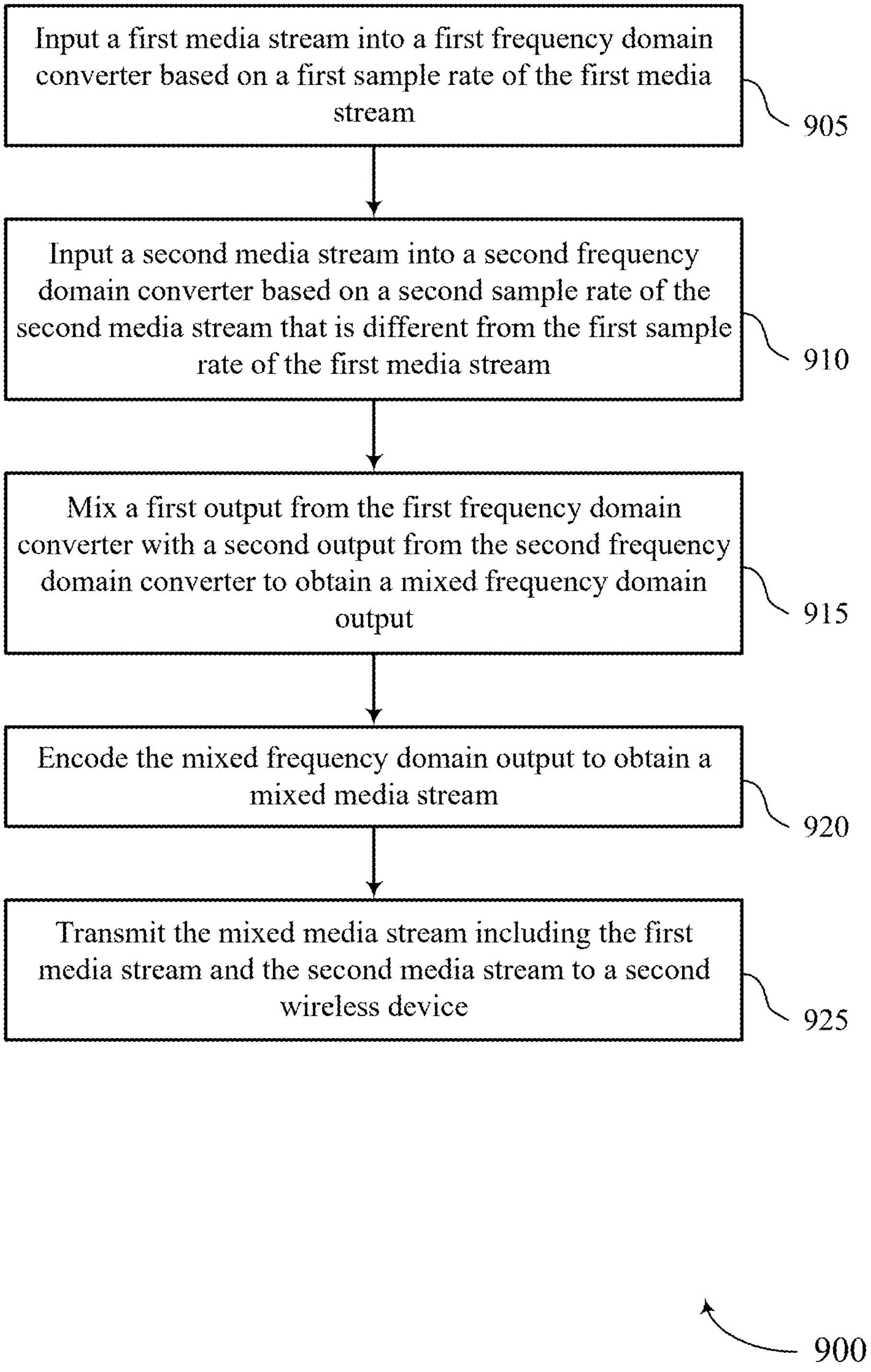
FIG. 9 shows a flowchart illustrating an example process performable by or at a first wireless device that supports multi-rate audio mixing.

FIG. 9 shows a flowchart illustrating an example process 900 performable by or at a first wireless device that supports multi-rate audio mixing. The operations of the process 900 may be implemented by a first wireless device or its components as described herein. For example, the process 900 may be performed by a wireless communication device, such as the wireless communication device 800 described with reference to FIG. 8, operating as or within a wireless AP or a wireless STA. In some examples, the process 900 may be performed by a wireless AP or a wireless STA, such as one of the APs 102 or the STAs 104 described with reference to FIG. 1.

In some examples, in 905, the first wireless device may input a first media stream into a first frequency domain converter based on a first sample rate of the first media stream. The operations of 905 may be performed in accordance with examples as disclosed herein. In some implementations, aspects of the operations of 905 may be performed by a media stream component 825 as described with reference to FIG. 8.

In some examples, in 910, the first wireless device may input a second media stream into a second frequency domain converter based on a second sample rate of the second media stream that is different from the first sample rate of the first media stream. The operations of 910 may be performed in accordance with examples as disclosed herein. In some implementations, aspects of the operations of 910 may be performed by a media stream component 825 as described with reference to FIG. 8.

In some examples, in 915, the first wireless device may mix a first output from the first frequency domain converter with a second output from the second frequency domain converter to obtain a mixed frequency domain output. The operations of 915 may be performed in accordance with examples as disclosed herein. In some implementations, aspects of the operations of 915 may be performed by a mixing component 830 as described with reference to FIG. 8.

In some examples, in 920, the first wireless device may encode the mixed frequency domain output to obtain a mixed media stream. The operations of 920 may be performed in accordance with examples as disclosed herein. In some implementations, aspects of the operations of 920 may be performed by an encoding component 835 as described with reference to FIG. 8.

In some examples, in 925, the first wireless device may transmit the mixed media stream including the first media stream and the second media stream to a second wireless device. The operations of 925 may be performed in accordance with examples as disclosed herein. In some implementations, aspects of the operations of 925 may be performed by a mixed stream transmission component 840 as described with reference to FIG. 8.

Implementation examples are described in the following numbered clauses:

Clause 1: A method for wireless communications at a first wireless device, comprising: inputting a first media stream into a first frequency domain converter based at least in part on a first sample rate of the first media stream; inputting a second media stream into a second frequency domain converter based at least in part on a second sample rate of the second media stream that is different from the first sample rate of the first media stream; mixing a first output from the first frequency domain converter with a second output from the second frequency domain converter to obtain a mixed frequency domain output; encoding the mixed frequency domain output to obtain a mixed media stream; and transmitting the mixed media stream comprising the first media stream and the second media stream to a second wireless device.

Clause 2: The method of clause 1, further comprising: inputting the mixed media stream to a pre-emphasis filter prior to encoding and transmitting the mixed media stream.

Clause 3: The method of any of clauses 1 through 2, further comprising: dropping a subset of frequency bins of a first set of frequency bins for the first output based at least in part on a quantity of frequency bins in a second set of frequency bins for the second output.

Clause 4: The method of clause 3, wherein the subset of frequency bins is based at least in part on a frequency bandwidth of a channel for transmission of the mixed media stream.

Clause 5: The method of any of clauses 1 through 4, further comprising: padding the second output from the second frequency domain converter prior to mixing the first output and the second output based at least in part on a frequency bandwidth of a channel for transmission of the mixed media stream.

Clause 6: The method of any of clauses 1 through 5, further comprising: selecting a first quantity of frequency bins for the mixed media stream based at least in part on a first radio bearer for the mixed media stream, wherein the first output of the first frequency domain converter and the second output of the second frequency domain converter correspond to the first quantity of frequency bins.

Clause 7: The method of clause 6, wherein the first quantity of frequency bins is selected based at least in part on a trigger to change from a second quantity of frequency bins to the first quantity of frequency bins.

Clause 8: The method of clause 7, further comprising: selecting a first table and a coefficient associated with encoding an energy envelope, a change to a partitioning of frequency bins into sub-bands, a second table associated with encoding bin residuals of the first output and the second output, or any combination thereof, based at least in part on the trigger.

Clause 9: The method of any of clauses 1 through 8, further comprising: jointly encoding the first output from the first frequency domain converter and the second output from the second frequency domain converter to obtain the mixed media stream.

Clause 10: The method of any of clauses 1 through 9, wherein the first frequency domain converter is a first modified discrete cosine transform, and the second frequency domain converter is a second modified discrete cosine transform.

Clause 11: The method of any of clauses 1 through 10, further comprising: obtaining an echo canceler output associated with the first sample rate or the second sample rate based at least in part on mixing the first output of the first frequency domain converter and the second output of the second frequency domain converter.

Clause 12: The method of any of clauses 1 through 11, further comprising: inputting one or more additional media streams into a respective one or more additional frequency domain converters based at least in part on a respective one or more additional sample rates of the one or more additional media streams; and mixing one or more outputs from the respective one or more additional frequency domain converters with the first output from the first frequency domain converter and the second output from the second frequency domain converter, wherein the mixed media stream includes the one or more additional media streams.

Clause 13: A first wireless device for wireless communications, comprising one or more memories storing processor-executable code, and one or more processors coupled with the one or more memories and individually or collectively operable to execute the code to cause the first wireless device to perform a method of any of clauses 1 through 12.

Clause 14: A first wireless device for wireless communications, comprising at least one means for performing a method of any of clauses 1 through 12.

Clause 15: A non-transitory computer-readable medium storing code for wireless communications, the code comprising instructions executable by one or more processors to perform a method of any of clauses 1 through 12.

As used herein, the term "determine" or "determining" encompasses a wide variety of actions and, therefore, "determining" can include calculating, computing, processing, deriving, estimating, investigating, looking up (such as via looking up in a table, a database, or another data structure), inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing and other such similar actions.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. Furthermore, as used herein, a phrase referring to "a" or "an" element refers to one or more of such elements acting individually or collectively to perform the recited function(s). Additionally, a "set" refers to one or more items, and a "subset" refers to less than a whole set, but non-empty.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A first wireless device, comprising:

a processing system that includes processor circuitry and memory circuitry that stores code, the processing system configured to cause the first wireless device to:

input a first media stream into a first frequency domain converter based at least in part on a first sample rate of the first media stream;

input a second media stream into a second frequency domain converter based at least in part on a second sample rate of the second media stream that is different from the first sample rate of the first media stream;

select a first quantity of frequency bins for a mixed media stream based at least in part on a first radio bearer for the mixed media stream;

mix a first output from the first frequency domain converter with a second output from the second frequency domain converter to obtain a mixed frequency domain output, wherein the mixed frequency domain output corresponds to the first quantity of frequency bins;

encode the mixed frequency domain output to obtain the mixed media stream; and transmit the mixed media stream comprising the first media stream and the second media stream to a second wireless device.

2. The first wireless device of claim 1, wherein the processing system is further configured to cause the first wireless device to:

input the mixed media stream to a pre-emphasis filter prior to encoding and transmitting the mixed media stream.

3. The first wireless device of claim 1, wherein the processing system is further configured to cause the first wireless device to:

drop a subset of frequency bins of a first set of frequency bins for the first output based at least in part on the first quantity of frequency bins.

4. The first wireless device of claim 3, wherein the subset of frequency bins is based at least in part on a frequency bandwidth of a channel for transmission of the mixed media stream.

5. The first wireless device of claim 1, wherein the processing system is further configured to cause the first wireless device to:

pad the second output from the second frequency domain converter prior to mixing the first output and the second output based at least in part on a frequency bandwidth of a channel for transmission of the mixed media stream.

6. The first wireless device of claim 1, wherein the first quantity of frequency bins is selected based at least in part on a trigger to change from a second quantity of frequency bins to the first quantity of frequency bins.

7. The first wireless device of claim 6, wherein the processing system is further configured to cause the first wireless device to:

select a first table and a coefficient associated with encoding an energy envelope, a change to a partitioning of frequency bins into sub-bands, a second table associated with encoding bin residuals of the first output and the second output, or any combination thereof, based at least in part on the trigger.

8. The first wireless device of claim 1, wherein the processing system is further configured to cause the first wireless device to:

jointly encode the first output from the first frequency domain converter and the second output from the second frequency domain converter to obtain the mixed media stream.

9. The first wireless device of claim 1, wherein the first frequency domain converter is a first modified discrete cosine transform, and the second frequency domain converter is a second modified discrete cosine transform.

10. The first wireless device of claim 1, wherein the processing system is further configured to cause the first wireless device to:

obtain an echo canceler output associated with the first sample rate or the second sample rate based at least in part on mixing the first output of the first frequency domain converter and the second output of the second frequency domain converter.

11. The first wireless device of claim 1, wherein the processing system is further configured to cause the first wireless device to:

input one or more additional media streams into a respective one or more additional frequency domain converters based at least in part on a respective one or more additional sample rates of the one or more additional media streams; and mix one or more outputs from the respective one or more additional frequency domain converters with the first output from the first frequency domain converter and the second output from the second frequency domain converter, wherein the mixed media stream includes the one or more additional media streams.

12. A method for wireless communications at a first wireless device, comprising:

inputting a first media stream into a first frequency domain converter based at least in part on a first sample rate of the first media stream;

inputting a second media stream into a second frequency domain converter based at least in part on a second sample rate of the second media stream that is different from the first sample rate of the first media stream;

selecting a first quantity of frequency bins for a mixed media stream based at least in part on a first radio bearer for the mixed media stream;

mixing a first output from the first frequency domain converter with a second output from the second frequency domain converter to obtain a mixed frequency domain output2 wherein the mixed frequency domain output corresponds to the first quantity of frequency bins;

encoding the mixed frequency domain output to obtain the mixed media stream; and transmitting the mixed media stream comprising the first media stream and the second media stream to a second wireless device.

13. The method of claim 12, further comprising:

inputting the mixed media stream to a pre-emphasis filter prior to encoding and transmitting the mixed media stream.

14. The method of claim 12, further comprising:

dropping a subset of frequency bins of a first set of frequency bins for the first output based at least in part on the first quantity of frequency bins.

15. The method of claim 14, wherein the subset of frequency bins is based at least in part on a frequency bandwidth of a channel for transmission of the mixed media stream.

16. The method of claim 12, further comprising:

padding the second output from the second frequency domain converter prior to mixing the first output and the second output based at least in part on a frequency bandwidth of a channel for transmission of the mixed media stream.

17. The method of claim 12, wherein the first quantity of frequency bins is selected based at least in part on a trigger to change from a second quantity of frequency bins to the first quantity of frequency bins.

18. A non-transitory computer-readable medium storing code for wireless communications, the code comprising instructions executable by one or more processors to:

input a first media stream into a first frequency domain converter based at least in part on a first sample rate of the first media stream;

input a second media stream into a second frequency domain converter based at least in part on a second sample rate of the second media stream that is different from the first sample rate of the first media stream;

select a first quantity of frequency bins for a mixed media stream based at least in part on a first radio bearer for the mixed media stream;

mix a first output from the first frequency domain converter with a second output from the second frequency domain converter to obtain a mixed frequency domain output, wherein the mixed frequency domain output corresponds to the first quantity of frequency bins;

encode the mixed frequency domain output to obtain the mixed media stream; and transmit the mixed media stream comprising the first media stream and the second media stream to a second wireless device.

* * * * *